United States Patent [19]
Sasaki et al.

[11] Patent Number: 5,822,491
[45] Date of Patent: Oct. 13, 1998

[54] TRACK DEVIATION MEASURING METHOD AND TRACK DEVIATION MEASURING APPARATUS

[75] Inventors: Masamichi Sasaki, Yokohama; Toyotaka Machida, Kashiwa; Osamu Samuta, Yokohama, all of Japan

[73] Assignee: Victor Company of Japan, Ltd., Japan

[21] Appl. No.: 770,880

[22] Filed: Dec. 20, 1996

[30] Foreign Application Priority Data

Dec. 28, 1995 [JP] Japan ..................................... 7-353509

[51] Int. Cl.[6] ...................................................... H04N 5/91
[52] U.S. Cl. ............................ 386/78; 386/79; 360/77.01
[58] Field of Search ................................... 386/1, 21, 31, 386/46, 78, 79, 80, 81, 86, 87, 113, 69; 360/77.01, 77.12, 77.13, 77.14, 75

[56] References Cited

U.S. PATENT DOCUMENTS 4,943,873  7/1990  Kawasaki .............................. 360/77.15
5,475,662  12/1995  Miyagawa et al. .................. 369/44.26

Primary Examiner—Andrew I. Faile
Assistant Examiner—Christopher Onuaku
Attorney, Agent, or Firm—Michael N. Meller

[57] ABSTRACT

Track deviation of a recorded track on a magnetic tape is measured in a non-destructive manner according to a measuring method and an apparatus employing the same. A magnetic tape recorded with an FM signal on its tracks conforming to a standard system, is loaded to the apparatus conforming to the same standard, and having a rotary drum with a head, thereby the tape is transported in a longitudinal direction and scanned helically by the head, the apparatus comprises device for setting measuring points along the tracks, device for stepwise shifting the tape causing head positions to displace stepwise along a track traversing line passing the measuring points perpendicularly to the tracks, device for measuring levels of the FM signal at displaced positions of the head device for converting thus measured levels into digital data, device for estimating, by using the digital data, a specific head position at which a maximum level of the FM signal is reproduced within each of the track traversing line, each specific head position having a positional value and device for subtracting a predetermined positional value from each positional value of the specific rotary head positions located along the tracks, wherein the predetermined positional value is determined to be a track center of standard track having a slant angle conforming to the standard, so that values of the track deviation varying along a track are measured.

18 Claims, 18 Drawing Sheets

Rotary Head Scanning Direction ⟶ (Y)
*Fig. 8-(1)* 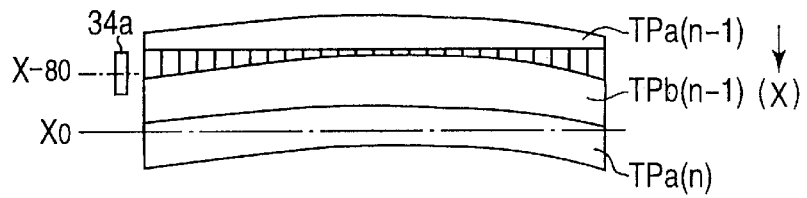
*Fig. 8-(2)* 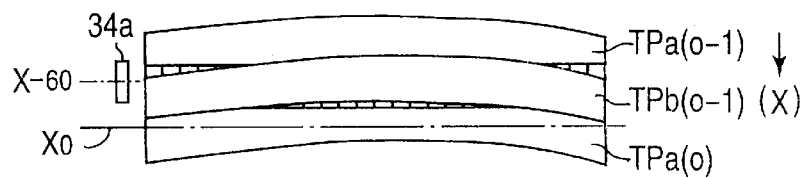
*Fig. 8-(3)* 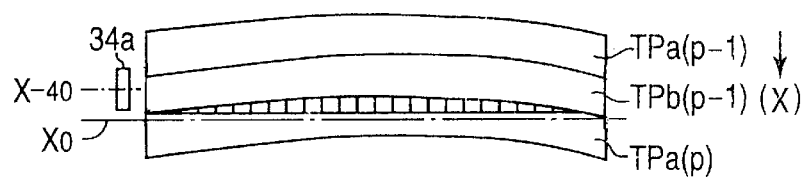
*Fig. 8-(4)* 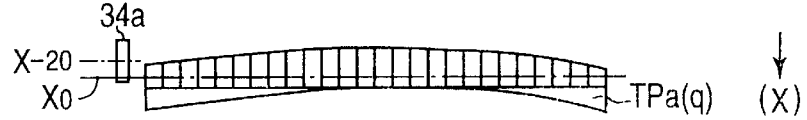
*Fig. 8-(5)* 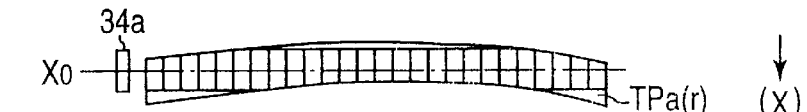
*Fig. 8-(6)* 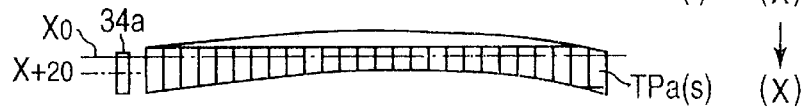
*Fig. 8-(7)* 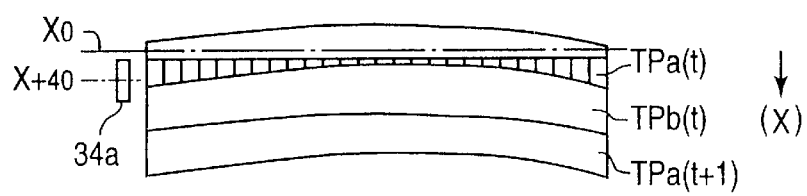
*Fig. 8-(8)* 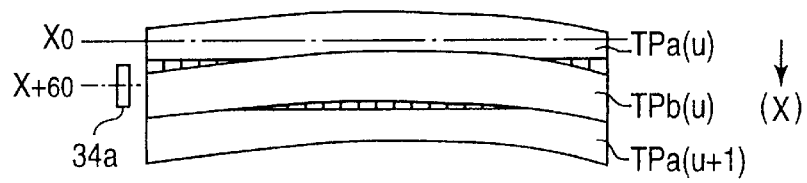
*Fig. 8-(9)* 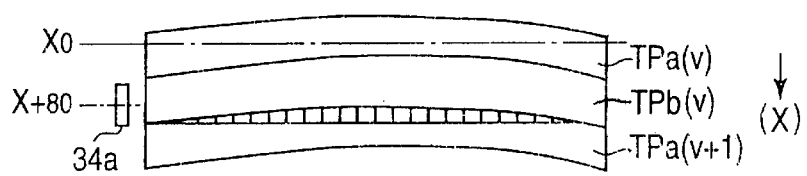

TRACK DEVIATION MEASURING METHOD AND TRACK DEVIATION MEASURING APPARATUS

BACKGROUND OF THE INVENTION

1. Field of the Invention

The present invention relates to a measuring method for measuring a track deviation of a recorded track obliquely formed on a magnetic tape in a helical scanning recording, and the apparatus employing the same method, and, particularly, relates to a non-destructive measuring method thereof.

2. Description of the Related Art

It is well known that in magnetic recording and reproducing apparatuses employing a helical scanning method such as a video tape recorder (VTR) which records a video and/or audio signal in a form of FM carrier and a digital audio tape recorder (DAT), a magnetic tape wounded on a pair of reels is pulled out thereof and is helically wound around a rotary drum having magnetic heads in a predetermined angular range in the apparatus, and the magnetic tape is recorded and reproduced being helically scanned by the magnetic heads rotated together with the rotary drum.

FIG. 1 is a perspective view of an ordinary magnetic recording/reproducing apparatus employing a helical scanning method in the prior art;

FIG. 2 is a plan view showing magnetic heads installed in a rotary drum in the prior art;

FIG. 3 is a plan view showing a tape pattern having a plurality of recorded tracks formed on a magnetic tape; and FIG. 4 is a plan view showing track deviations of the recorded tracks on a magnetic tape in the prior art.

Referring to FIG. 1, in an ordinary magnetic recording/reproducing apparatus 10A employing the helical scanning method, a tape cassette 1A is mounted on a front side of a chassis 11. In the tape cassette 1A, there are accommodated a magnetic tape 2A of which one and another ends are respectively wound on a supply reel 3A and a take-up reel 4A.

In FIG. 1, a reference character 12 denotes a tension arm provided on a tape supply side of a rotary drum 30 as a tape loading device, the arm 12 moves reciprocally on the chassis 11, 13 a tension pole supported by the tension arm 12, 14 a first loading base, 15 and 16 a tape guide roller and a slant pole both provided on the first loading base 14, 17 a second loading base, 19 and 18 a tape guide roller and a slant pole both provided on the second loading base 17 at the tape take-up side of the rotary drum 30. The magnetic tape 2A is pulled out from a front side of the tape cassette 1A and is helically wound around the rotary drum 30 at a predetermined angular range by the guide rollers 15, 19 and the slant poles 16, 18.

Reference character 20 denotes a full track erase head provided on the tape supply side of the rotary drum 30 for erasing the recorded signals on the magnetic tape 2A, 21 an impedance roller for stabilizing tape running, 22 a capstan rotatably provided on the tape take-up side on the chassis 11 for moving the magnetic tape 2A at a constant speed, 23 a pinch roller arm, 24 a pinch roller supported by the pinch roller arm 23 for detachably engaging with the capstan 22, and 25 an AC head (a combined audio and control signals head) provided on the tape take-up side for recording and reproducing audio signals and control signals.

The rotary drum 30 provided on an inner part of the chassis 11 generally comprises a lower drum 31 fixed on the chassis 11 and an upper rotary drum 33 coaxially and rotatably provided on a shaft 32 over the lower drum 31. The lower drum 31 has a lead 31a helically formed thereon for leading the magnetic tape 2A helically by causing a lower edge of the magnetic tape 2A to contact with the lead 31a. On a lower surface of the upper rotary drum 33 opposing to an upper surface of the lower drum 31, there are provided a plurality of rotary magnetic heads (referred to as rotary heads) 34 so as to protrude slightly from an outer periphery of the upper rotary drum 33.

As shown in FIG. 2, the plurality of rotary heads 34 include a pair of ch-1 and ch-2 standard playing time mode (referred to as SP Mode) video heads 34a, 34b each having a different azimuth angle from another, i.e, of +6° or −6° for the SP Mode, a pair of an extended playing time mode (referred to as EP Mode) video heads 34c, 34d each having a different azimuth angle from another, i.e, +6° or −6° for the EP Mode, and a pair of high fidelity audio (referred to as audio) heads 34e, 34f each having a different azimuth angle from another, i.e., +30° or −30°, and respective heads of each pair are symmetrically opposed at 180° from each other. Here, these pairs, i.e., the ch-1 and ch-2 EP Mode video heads 34c, 34d and the ch-1 and ch-2 SP Mode video heads 34a, 34b and the ch-1 and ch-2 audio heads 34e, 34d are orderly disposed at a predetermined angular interval in a direction of a drum rotation (an arrow K).

Referring to FIG. 1 again, in the apparatus 10A, the magnetic tape 2A wound around the rotary drum 30 is driven in a direction of an arrow S by being pinched between the capstan 22 and the pinch-roller 24, and at the same time, the rotary heads 34 together with the upper rotary drum 33 are rotated with the shaft 32 in a direction of an arrow K. Thus, video signal and high-fidelity audio signals (L and R) are recorded on the magnetic tape 2A with the rotary heads 34 in such a manner that a plurality of recorded tracks TP are obliquely formed to have a predetermined angle to a longitudinal direction of the magnetic tape 2A. The predetermined angle of the recorded tracks TP is defined by a tape running direction and a relative speed between the magnetic tape 2A and the rotary heads 34. Incidentally, these recorded tracks TP can not be visually observed directly.

As shown in FIG. 3, in the apparatus 10A based on a well known VHS standard or S-VHS standard, loci of the recorded tracks TP caused by the rotary heads 34 vary according to the kind of the rotary heads 34 used. Specifically, the recorded tracks TPa, TPb are formed at a width of about 58 μm by using the ch-1 and ch-2 SP Mode video heads 34a, 34b. These recorded tracks are referred to as ch-1 and ch-2 SP Mode video tracks TPa, TPb, hereinafter.

On the other hand, recorded tracks TPc, TPd are formed at a narrower width of about 19 μm by using the ch-1 and ch-2 EP Mode video heads 34c, 34d. These recorded tracks are referred to as ch-1 and ch-2 EP Mode video tracks TPc, TPd, hereinafter.

Further, recorded tracks TPe, TPf are recorded in a deeper inner part of a magnetic layer of the magnetic tape 2A under the ch-1 and ch-2 SP Mode video tracks TPa, TPb by using the ch-1 and ch-2 audio heads 34e, 34f. These recorded tracks are referred to as ch-1 and ch-2 audio tracks TPe, TPf hereinafter. Upon recording, the ch-1 and ch-2 audio tracks TPe, TPf are to be recorded preceding the ch-1 and ch-2 SP Mode video tracks TPa, TPb. Upon forming the ch-1 audio track TPe on the magnetic tape 2A, there are two cases. Specifically, one is that the ch-1 audio track TPe is formed preceding the track TPa about one video frame period by the ch-1 audio head 34e located behind (with respect to the direction K) the ch-1 SP Mode video head 34a, and another is that the ch-1 audio track TPe is formed by the ch-2 audio head 34f located before the ch-1 SP Mode video head 34a.

Further, though an illustration is not provided, the ch-1 and ch-2 audio tracks TPe, TPf may be formed under the ch-1 and ch-2 EP Mode video tracks TPc, TPd by using the ch-1 and ch-2 audio heads 34e, 34f.

On an upper portion and a lower portion of the magnetic tape 2A, there are formed linear audio tracks A and T and a linear control track CT by using the AC Audio/Control head 25.

In the ordinary recording and reproducing apparatus 10A employing the helical scanning recording system such as the VHS and S-VHS standards, the recorded tracks TP obliquely formed by the rotary heads 34 have a predetermined track angle, for instance, 5° 58' 9.9" in the SP Mode and 5° 56' 48.1" in the EP Mode for the track formed on a running magnetic tape as shown in FIG. 3 and as shown with two-dotted chain lines in FIG. 4. In this case, an allowable track deviation of each of the recorded tracks TP is specified in the industry standard, for instance, not more than 14 µm in the SP Mode and not more than 10 µm in the EP Mode so as to hold compatibility of the recorded magnetic tape 2A with the apparatus as made conforming to the same standard. Actually, the values of the track deviations thereof are determined so as to satisfy target values of no more than 10 µm in the SP Mode and of no more than 7 µm in the EP Mode.

However, when the tape running system of the magnetic tape 2A does not work well in the apparatus 10A or the rotary heads 34 are inaccurately mounted on the upper rotary drum 33, a track deviation occurs on each of the recorded tracks as shown with real lines in FIG. 4. This causes a compatibility problem of the magnetic tape 2A among the apparatus 10A made according to the same standard. In this case, it will be understood that a plurality of recorded tracks formed by a certain rotary head 34 has a same track deviation because they are formed in a same recording condition.

Thus, upon developing or producing the apparatus 10A, the track deviation of the recorded track is checked whether it is within the value specified in the standard if necessary as follows.

In a conventional measuring method and a device for measuring the track deviation, the magnetic tape on which recorded tracks are formed, is cut to a certain length, and the recorded tracks of the cut portion are developed by coating a magnetic powder thereon, resulting in a reveal of a track pattern of the recorded tracks because the recorded tracks attract the magnetic powder. Thus, it is possible for a calibration purpose to visually measure the track deviation of the recorded tracks by using a microscope with an X-Y table capable of moving in an X direction and in a Y direction of the cut tape.

However, in the conventional measuring method and device of the track deviation, there are problems that the recorded tape has to be cut and it is time consuming to measure because of complicated measuring processes.

Further, as explained with FIG. 3, the ch-1 and ch-2 audio tracks TPe, TPf are formed in the deeper part of the magnetic layer under the ch-1 and ch-2 SP Mode video tracks TPa, TPb by using the ch-1 and ch-2 audio heads 34e, 34f. Thus, when the track deviations of both the ch-1 and ch-2 SP Mode video tracks TPa, TPb and the ch-1 and ch-2 audio tracks TPe, TPf are intended to be measured by the conventional measuring method, it is impossible to measure them separately because the track patterns revealing both the ch-1 and ch-2 SP Mode video track TPa, TPb and the ch-1 and ch-2 audio tracks TPe, TPf are superimposed.

SUMMARY OF THE INVENTION

Accordingly, a general object of the present invention is to provide a measuring method of a deviation of a recorded track formed on the magnetic tape and an apparatus for measuring the deviation of the recorded track, in which the above disadvantages have been eliminated.

A specific object of the present invention is to provide method for measuring a track deviation of magnetic tape on which tracks are recorded with an FM modulated signal according to a standard helical scanning system, the magnetic tape being loaded to a measuring magnetic tape reproducing apparatus conforming to the standard helical scanning system, the apparatus having a rotary drum with at least a rotary head, thereby the magnetic tape is transported in a longitudinal direction thereof in the apparatus and scanned helically by the rotary head for measuring the track deviation, the method comprising steps of: setting measuring points along each of the tracks; stepwise shifting the magnetic tape in the longitudinal direction for causing rotary head positions to displace stepwise and relatively with respect to the tracks along a track traversing line which passes through each of the measuring points perpendicularly to the tracks; measuring amplitude levels of the FM modulated signal at respective positions of the rotary head displaced stepwise along the track traversing line; converting thus measured amplitude levels into digital data; calculating to estimate, by using the digital data, a specific rotary head position at which a maximum amplitude level of the FM signal is reproduced within each of the track traversing line, each of the specific rotary head position having a positional value; and subtracting a predetermined positional value from each positional value of respective specific rotary head positions located along each of the tracks, wherein the predetermined positional value is determined to be a track center position of standard track having a slant angle conforming to the standard helical scanning system, thereby values of the track deviation varying along a track referred to the standard track are measured.

An another and more specific object of the present invention is to provide a track deviation measuring method comprising the steps of: helically winding a test magnetic tape formed with recorded tracks which are obliquely recorded in a predetermined direction by using a magnetic recording/reproducing apparatus employing a helically scanning method, around a rotary drum having at least a rotary head of a magnetic recording/reproducing apparatus at a predetermined angle and driving the test magnetic tape along a predetermined tape path, the recorded tracks of the test magnetic tape having almost no track deviation; relatively and stepwise shifting the rotary head to recorded tracks in a width direction of the magnetic tape in a predetermined range by causing the test magnetic tape to be displaced in a tape running direction; measuring values of an FM envelope at plural measuring points set up along each of the recorded tracks by causing the rotary head to scan on the recorded tracks at every stepwise shifting position of the rotary head; converting the values of the FM envelope obtained at the plural measuring points into digital data and to store the digital data in a memory section; calculating a stepwise shifting position of the rotary head corresponding to a maximum value among the plural digital data obtained at a certain measuring point among the plural measuring points, and other stepwise shifting positions of the rotary head corresponding to maximum values at the rest measuring points among the plural measuring points; calculating a deviation value of each of the stepwise shifting positions corresponding to the maximum values from a center of a normal recorded track; and forming track deviation data from the deviation value of each of the stepwise shifting positions of the rotary head.

Other more specific object of the present invention is to provide a track deviation measuring apparatus comprising: a first magnetic recording/reproducing apparatus generating almost no track deviation, the apparatus being equipped with a rotary drum having at least a rotary head, wherein a magnetic tape formed with recorded tracks obliquely recorded in a predetermined direction by using a second magnetic recording/reproducing apparatus employing a helically scanning method is helically wound around the rotary drum of the first apparatus at a predetermined angle and runs along a tape path; rotary head shifting means for relatively and stepwise shifting the rotary head to the recorded tracks in a width direction of the magnetic tape in a predetermined range, the rotary head shifting means allowing the rotary head to scan so as to measure FM envelope values at plural measuring points set up along each of the recorded tracks at every stepwise shifting position; converting means for converting the FM envelope values into digital data; a memory means for storing the digital data obtained; arithmetic means for calculating a stepwise shifting position of the rotary head corresponding to a maximum value among the plural digital data obtained at a certain measuring point among the plural measuring points and other stepwise shifting positions of the rotary head corresponding to maximum values at the rest measuring points, the arithmetic means further calculating a deviation value of each of the stepwise shifting positions of the rotary head from a center of a normal recorded track; and track deviation forming means for forming track deviation data from the deviation value of each of the stepwise shifting positions of the rotary head.

Other more specific object of the present invention is to provide a track deviation measuring apparatus for measuring a track deviation of magnetic tape on which tracks are recorded with an FM modulated signal according to a standard helical scanning system, the apparatus comprising: a measuring magnetic tape reproducing device conforming to the standard helical scanning system, the device having a rotary drum with at least a rotary head, the magnetic tape being loaded and transported in a longitudinal direction thereof in the device and scanned helically by the rotary head for measuring the track deviation, the apparatus comprising: means for setting measuring points along each of the tracks; means for stepwise shifting the magnetic tape in the longitudinal direction for causing rotary head positions to displace stepwise and relatively with respect to the tracks along a track traversing line which passes through each of the measuring points perpendicularly to the tracks; means for measuring amplitude levels of the FM modulated signal at respective positions of the rotary head displaced stepwise along the track traversing line; means for converting thus measured amplitude levels into digital data; means for storing the digital data converted by the converting means; means for calculating to estimate, by using the digital data, a specific rotary head position at which a maximum amplitude level of the FM signal is reproduced within each of the track traversing line, each of the specific rotary head position having a positional value; means for subtracting a predetermined positional value from each positional value of respective specific rotary head positions located along each of the tracks, wherein the predetermined positional value is determined to be a track center position of standard track having a slant angle conforming to the standard helical scanning system, so that values of the track deviation varying along a track referred to the standard track are measured.

Other more specific object of the present invention is to provide a method for measuring a head locus deviation of magnetic tape reproducing apparatus conforming to a standard helical scanning system by using a standard magnetic tape on which tracks are recorded with an FM modulated signal conforming to the standard helical scanning system, the tracks having minimum track deviation and the apparatus having a rotary drum with at least a rotary head, the method comprising steps of: loading the standard magnetic tape to the magnetic tape reproducing apparatus to be measured of the head locus deviation value, thereby the standard magnetic tape is transported in a longitudinal direction thereof in the apparatus and scanned helically by the rotary head for measuring the head locus deviation; setting measuring points along each of the tracks; stepwise shifting the magnetic tape in the longitudinal direction for causing rotary head positions to displace stepwise and relatively with respect to the tracks along a track traversing line which passes through each of the measuring points perpendicularly to the tracks; measuring amplitude levels of the FM modulated signal at respective positions of the rotary head displaced stepwise along the track traversing line; converting thus measured amplitude levels into digital data; calculating to estimate, by using the digital data, a specific rotary head position at which a maximum amplitude level of the FM signal is reproduced within each of the track traversing line, each of the specific rotary head position having a positional value; subtracting a predetermined positional value from each positional value of respective specific rotary head positions located along each of the tracks, wherein the predetermined positional value is determined to be a track center position of standard track having a slant angle conforming to the standard helical scanning system, thereby values of the head locus deviation varying along a track scan referred to the standard track is measured.

Other objects and further features of the present invention will be apparent from the following detailed description.

BRIEF DESCRIPTION OF THE DRAWINGS

FIGS. 8-(1) to 8-(9) are schematic views for explaining statuses that video FM signals vary when the rotary heads are stepwise shifted;

DETAILED DESCRIPTION OF THE PREFERRED EMBODIMENT

Figure 1:
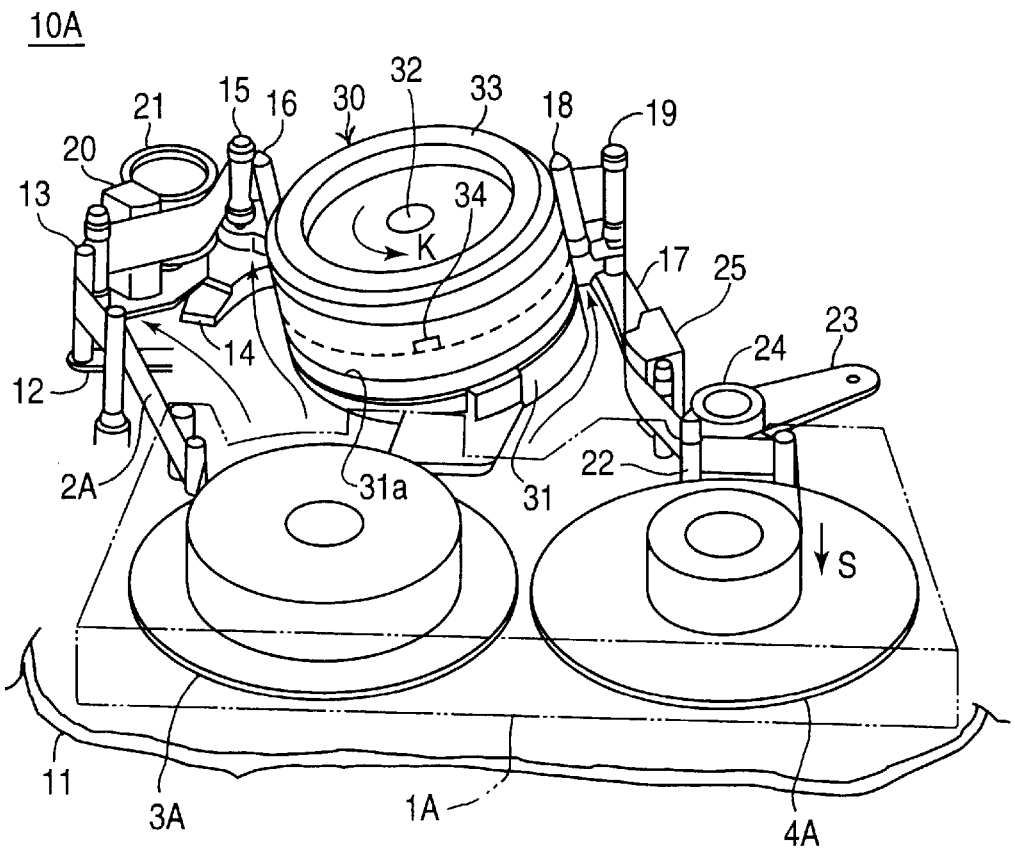
FIG. 1 is a perspective view of an ordinary magnetic recording/reproducing apparatus employing a helical scanning method in the prior art.

Description is now given of a first and second embodiments according to the present invention referring to FIGS. 5 to 20, wherein the like reference characters as shown in FIGS. 1 to 4 denote like or corresponding parts throughout the drawings, and detailed descriptions of the like parts are omitted for simplicity except for new parts employed.

[First Embodiment]

Figure 5:
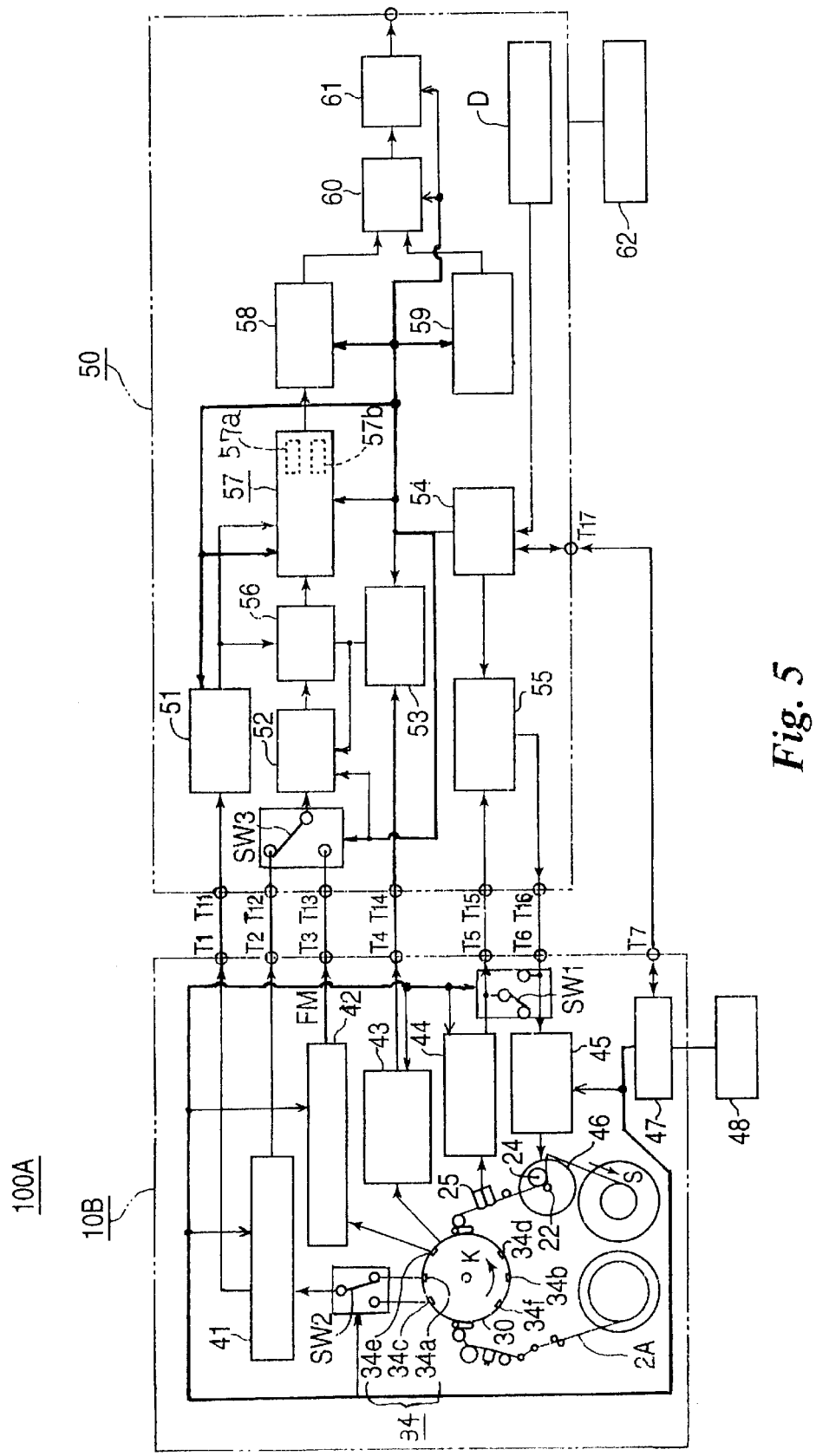
FIG. 5 is a block diagram for explaining a track deviation measuring method and a track deviation measuring apparatus of a first embodiment of the present invention.
Figure 6:
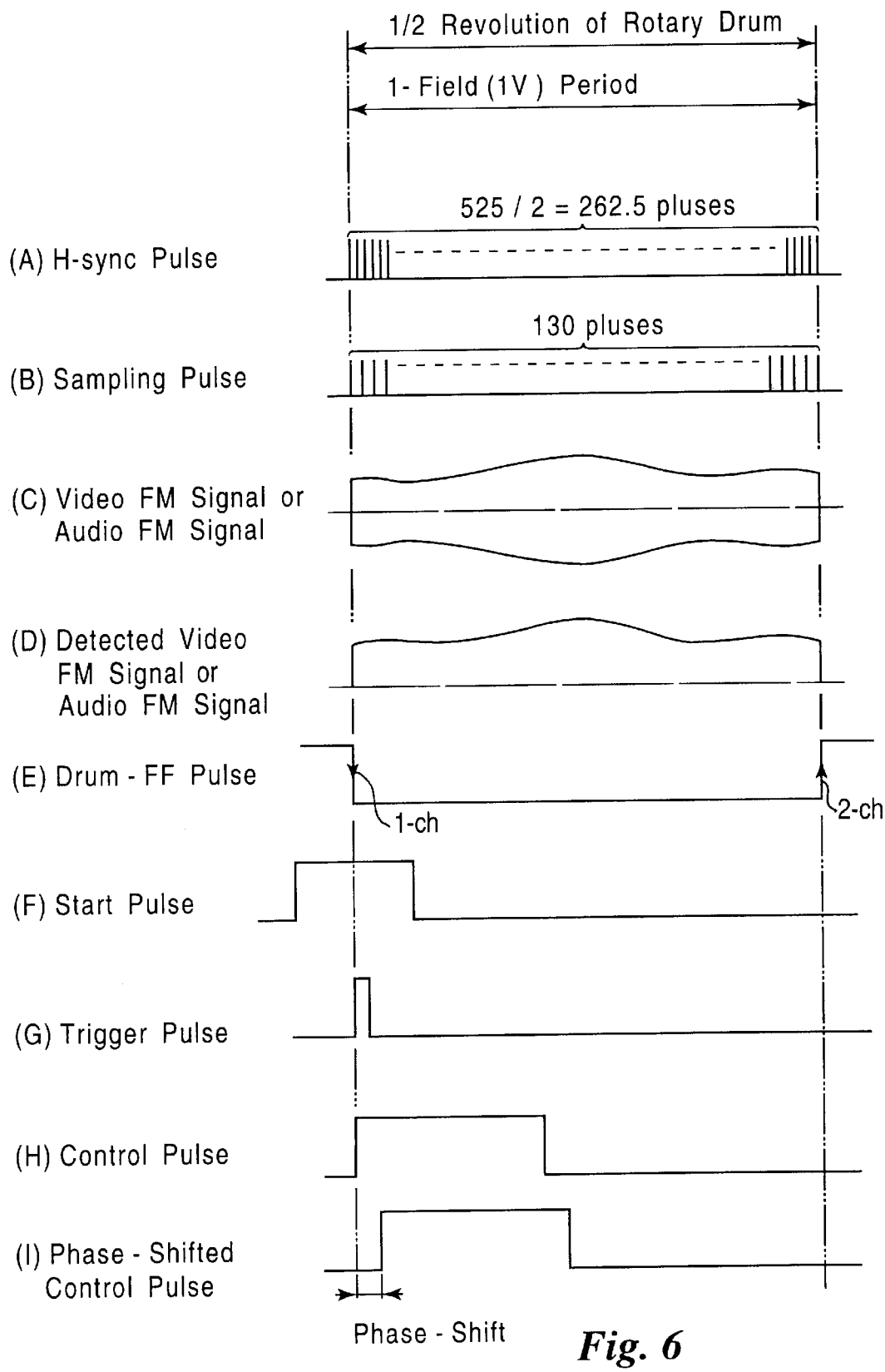
FIGS. 6(A) to 6(I) show waveforms of various kinds of signals used in the track deviation measuring apparatus shown in FIG. 5.
Figure 7:
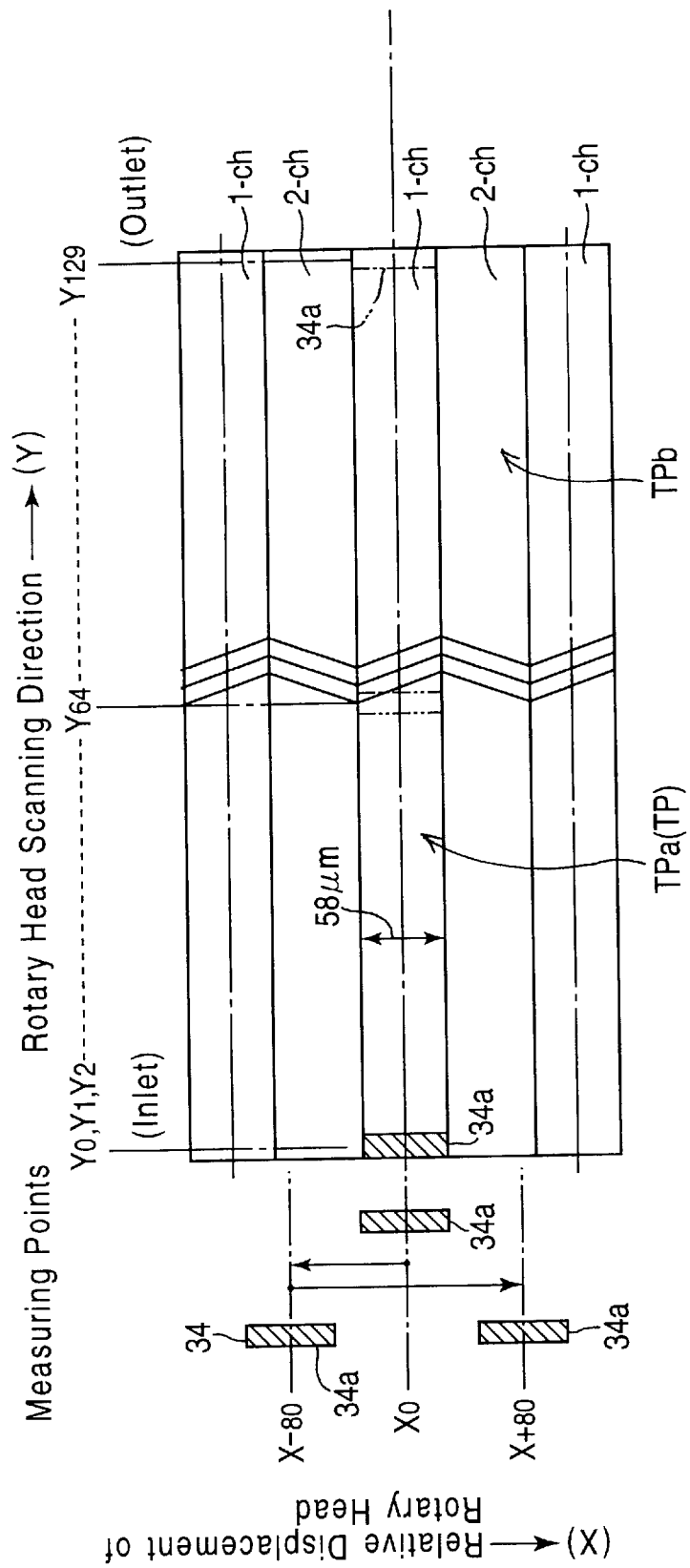
FIG. 7 is a schematic view for explaining an operation of a rotary head shifting mechanism which causes the rotary head to displace relatively perpendicular to the recorded tracks and an operation of measuring video FM signals in the apparatus when the recorded tracks are scanned with the rotary heads.
Figure 9:
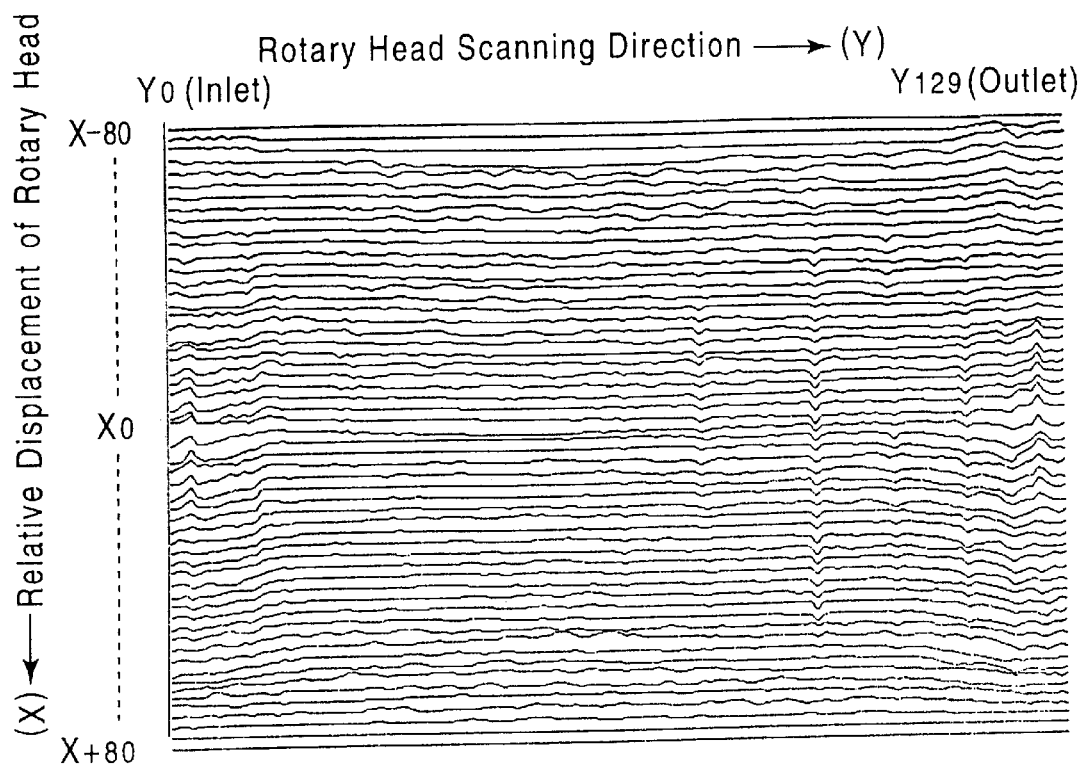
FIG. 9 is a chart for explaining output signals from an envelope detecting section.
Figure 10:
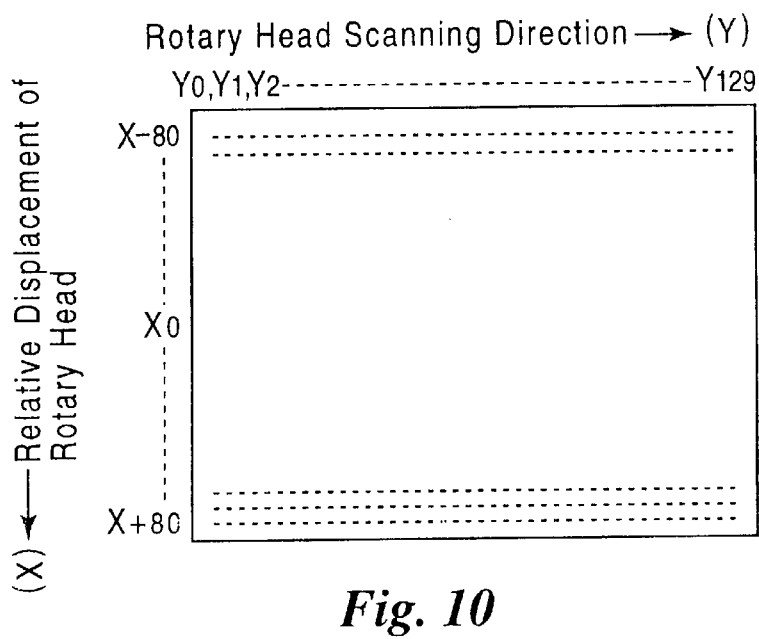
FIG. 10 is a schematic view for explaining digital data temporally stored in a track deviation data forming section in a personal computer.
Figure 11A:
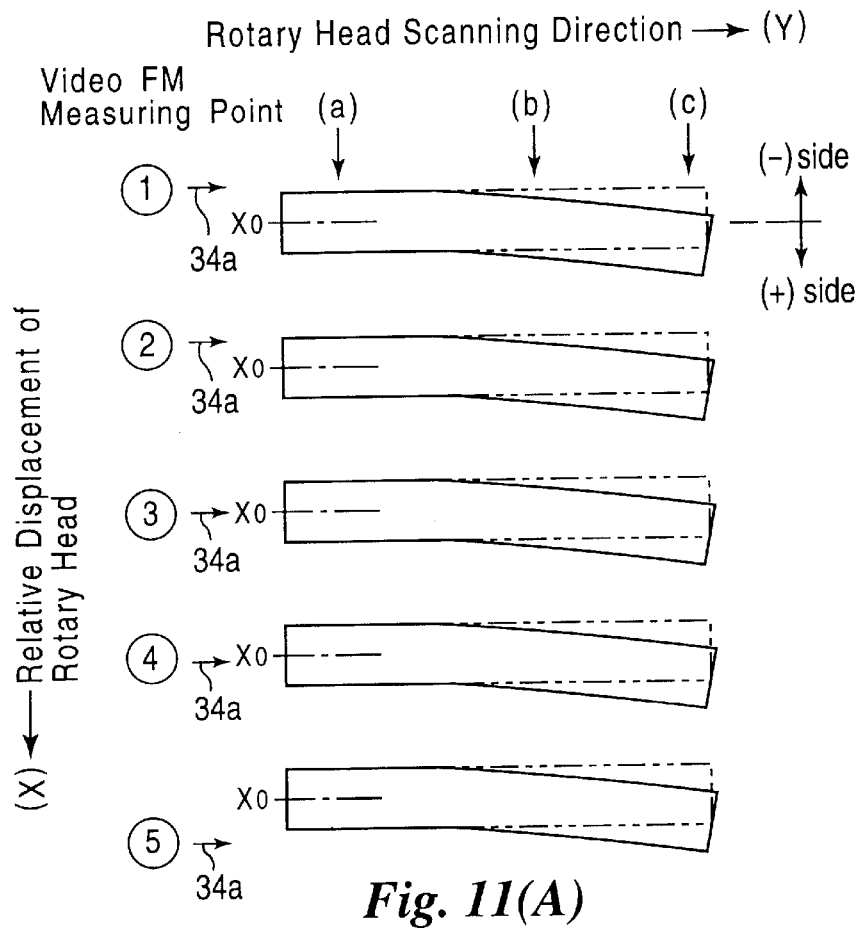
FIGS. 11(A) and 11(B) are schematic views for explaining a procedure for obtaining track deviation data of recorded tracks formed on the magnetic tape.
Figure 11B:
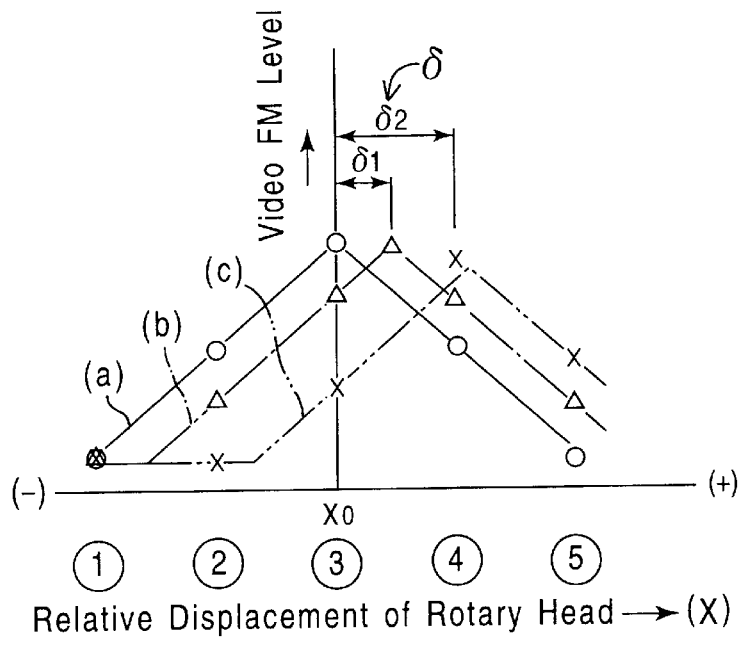
Figure 12A:
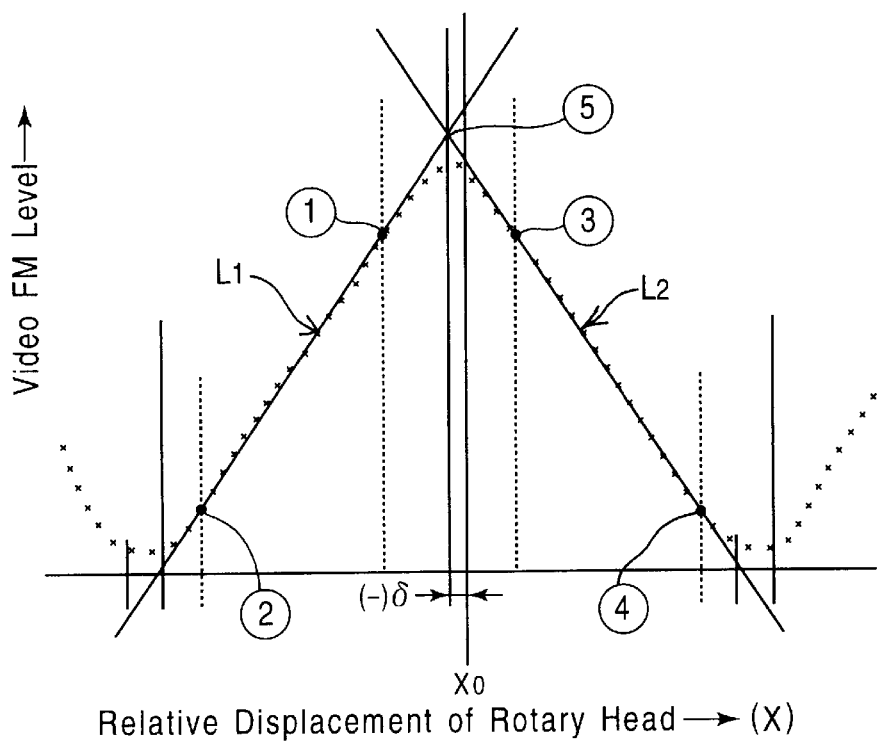
FIGS. 12(A) and 12(B) are schematic views for explaining a procedure for obtaining track deviation data of recorded tracks formed on the magnetic tape.
Figure 12B:
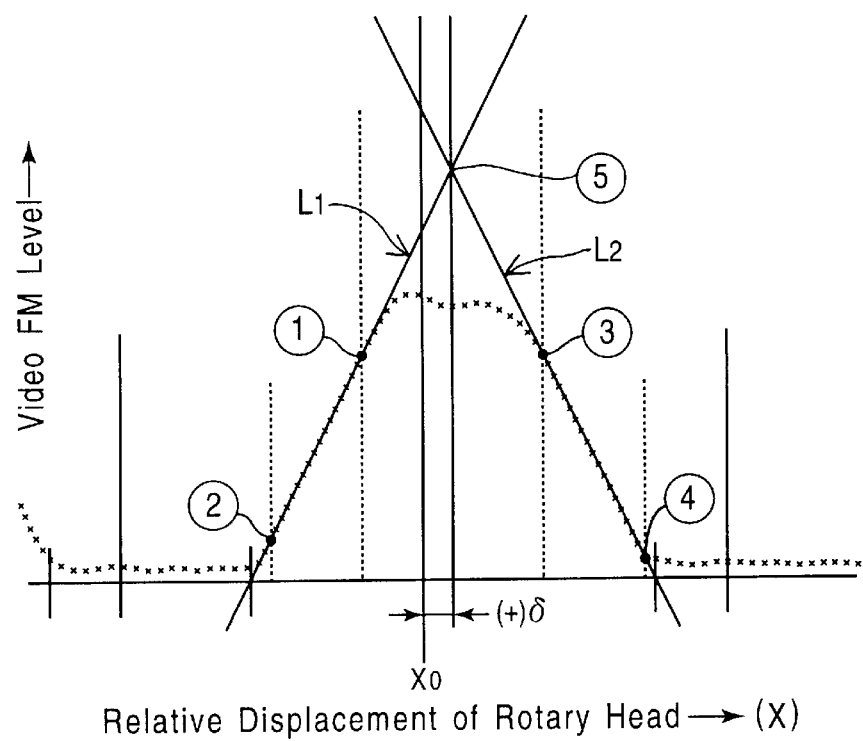
Figure 13A:
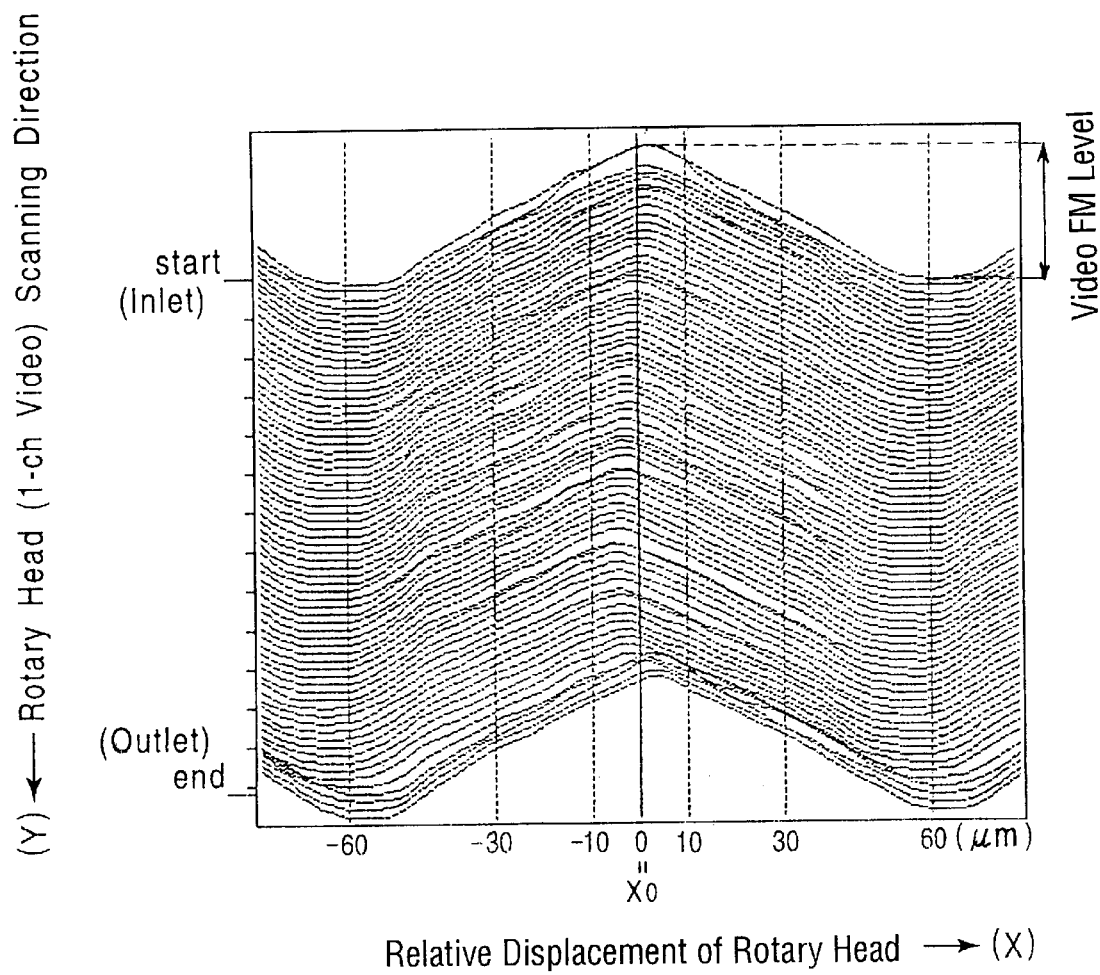
FIGS. 13(A) and 13(B) are resultant charts obtained, each exhibiting data of ternary track deviation caused on the magnetic tape measured.
Figure 13B:
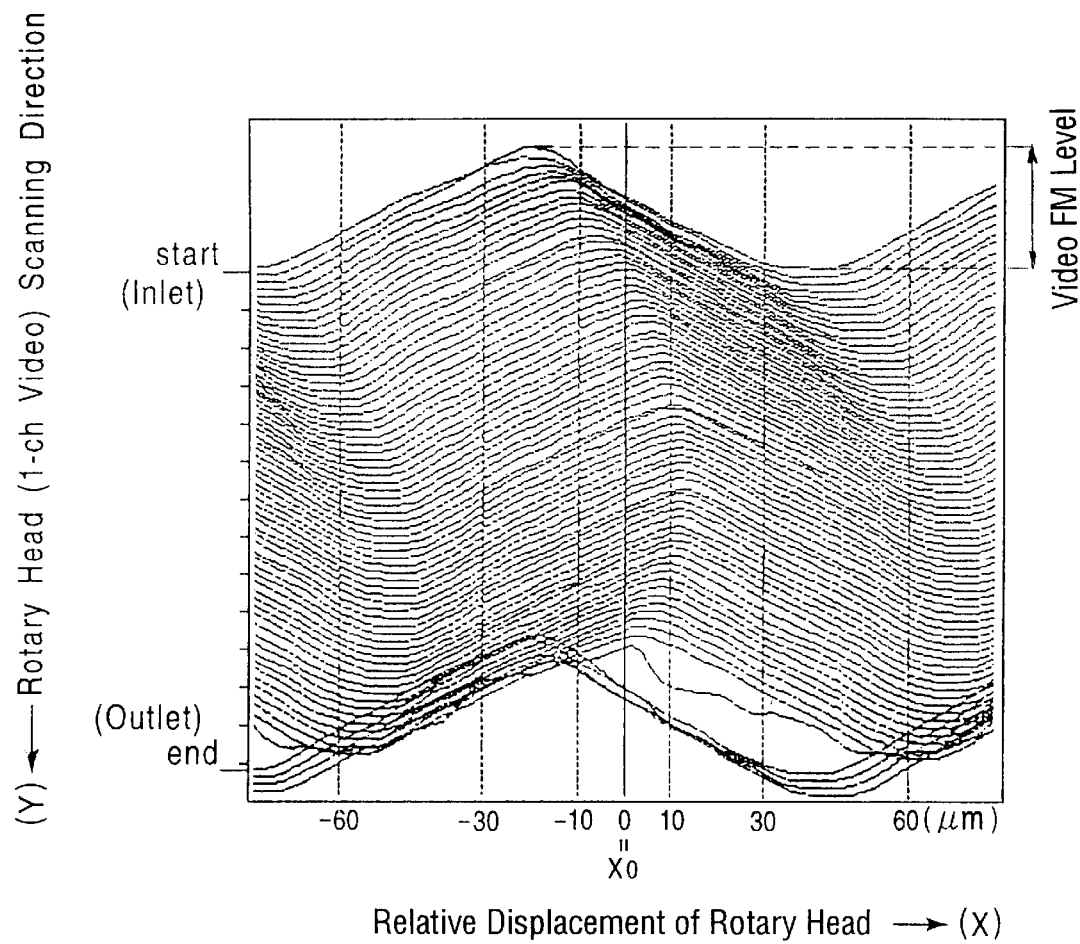
Figure 14A:
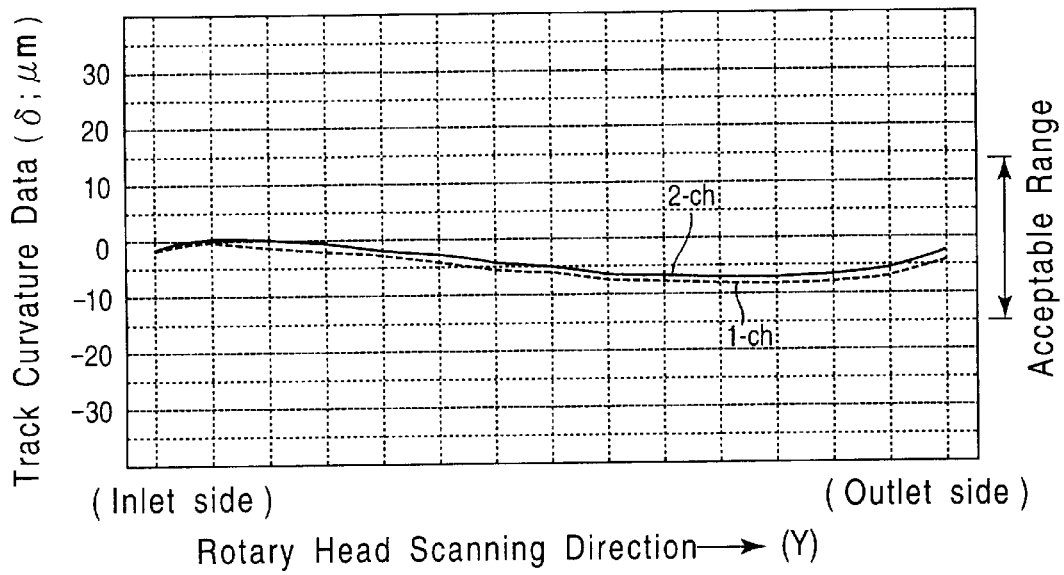
FIGS. 14(A) and 14(B) are graphs, each exhibiting data of track deviation caused on the magnetic tape measured.
Figure 14B:
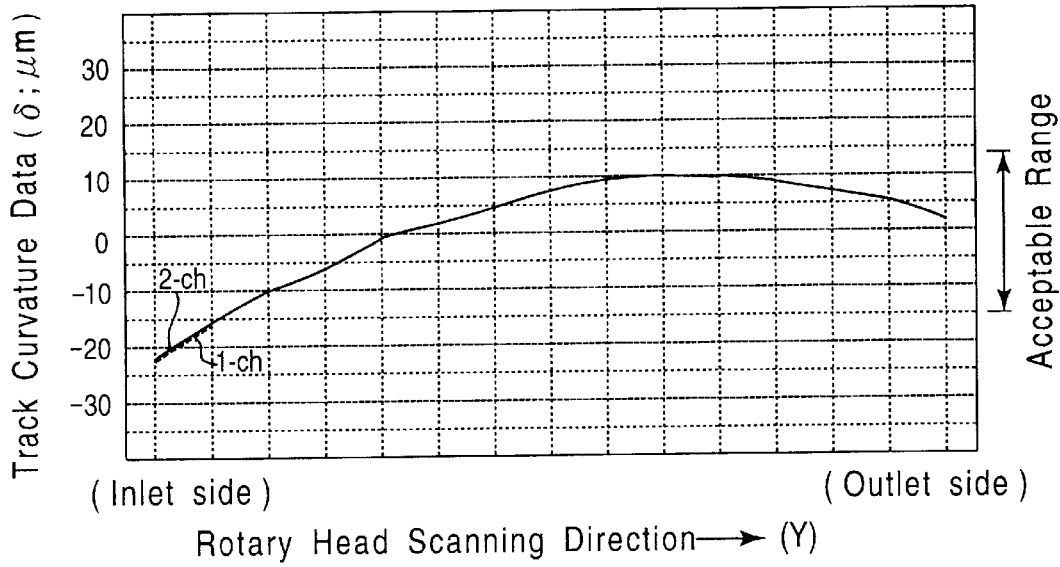
Figure 15:
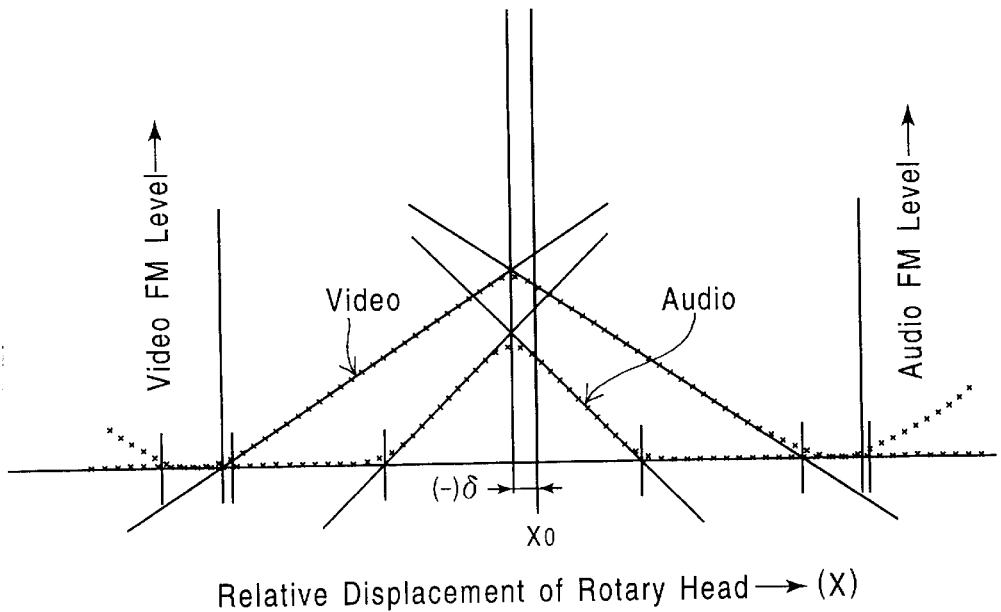
FIG. 15 is a chart for explaining a procedure to obtain track deviation data of the video tracks and the audio tracks formed in the deeper part of the magnetic layer at the same time.
Figure 17:
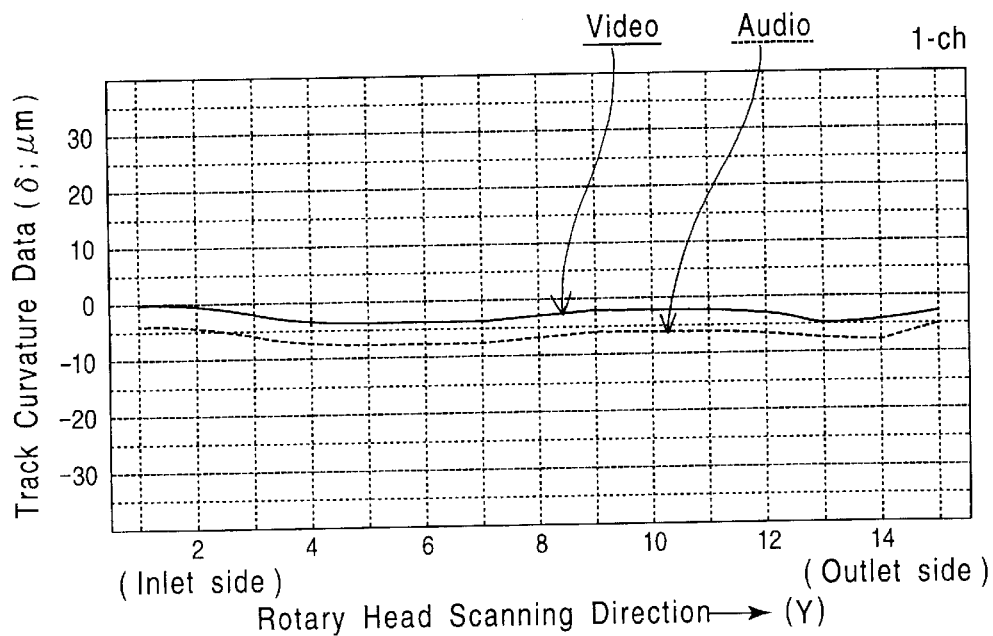
FIG. 17 is a resultant graph obtained when track deviation data of the video tracks and the audio tracks are obtained at the same time, wherein respective curves display data of track deviation on the magnetic tape with respect to the video tracks and the inner audio tracks.
Figure 16A:
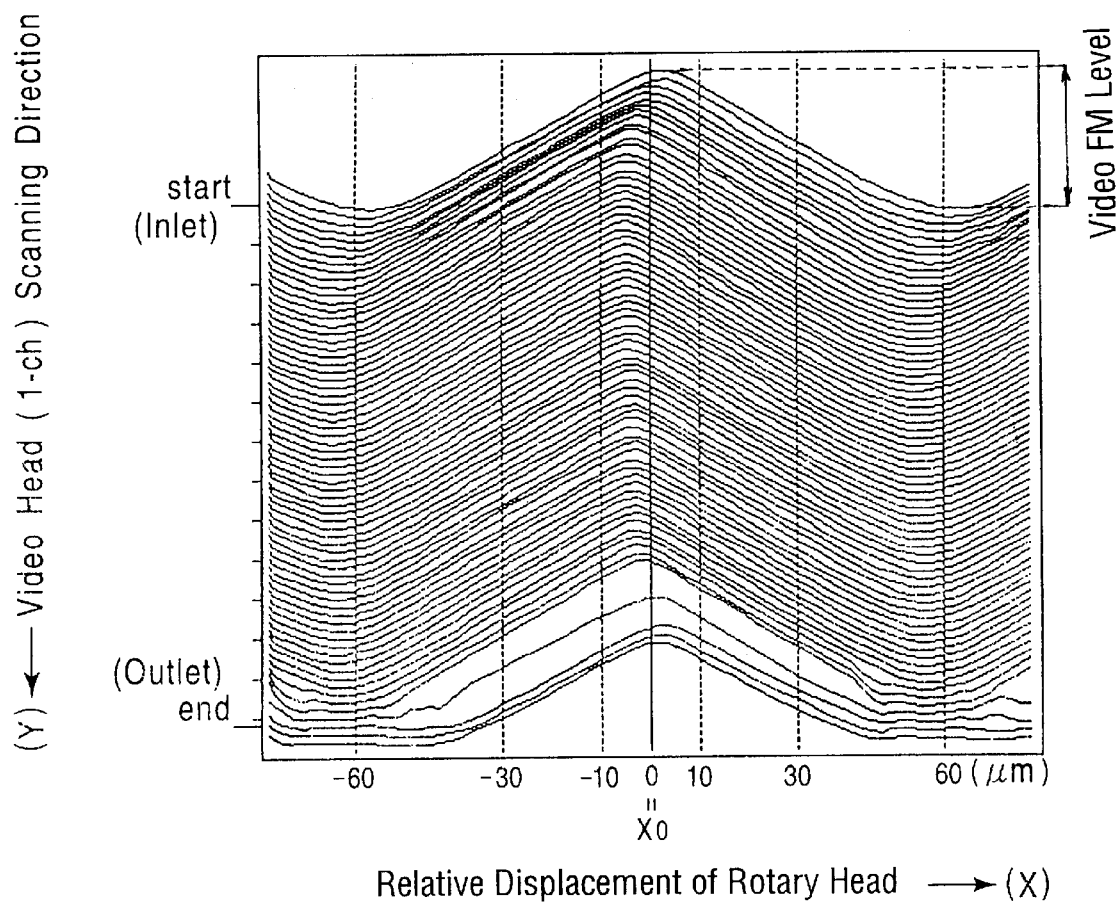
FIGS. 16(A) and 16(B) are resultant charts when track deviation data of the video tracks and the audio tracks are obtained at the same time, wherein each of them displays ternary data of track deviation on the magnetic tape.
Figure 16B:
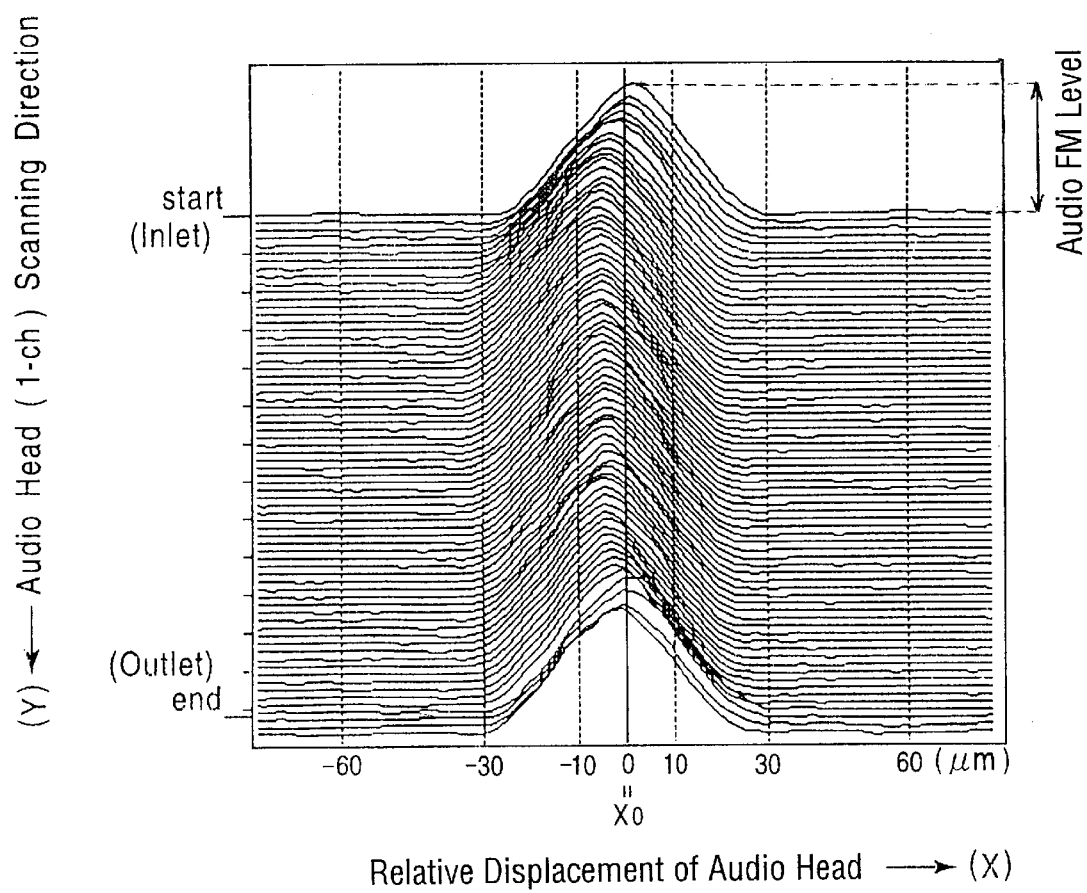

FIG. 5 is a block diagram for explaining a track deviation measuring method and a track deviation measuring apparatus of a first embodiment of the present invention;

FIGS. 6(A) to 6(I) show waveforms of various kinds of signals used in the track deviation measuring apparatus shown in FIG. 5;

FIG. 7 is a schematic view for explaining an operation of a rotary head shifting mechanism which causes the rotary head to displace relatively perpendicular to the recorded tracks and an operation of measuring video FM signals in the apparatus when the recorded tracks are scanned with the rotary heads;

FIGS. 8-(1) to 8-(9) are schematic views for explaining statuses that video FM signals vary when the rotary heads are stepwise shifted;

FIG. 9 is a chart for explaining output signals from an envelope detecting section;

FIG. 10 is a schematic view for explaining digital data temporally stored in a track deviation data forming section in a personal computer;

FIGS. 11(A) and 11(B) are schematic views for explaining a procedure for obtaining track deviation data of recorded tracks formed on the magnetic tape;

FIGS. 12(A) and 12(B) are schematic views for explaining a procedure for obtaining track deviation data of recorded tracks formed on the magnetic tape;

FIGS. 13(A) and 13(B) are resultant charts obtained, each exhibiting data of ternary track deviation caused on the magnetic tape measured;

FIGS. 14(A) and 14(B) are graphs, each exhibiting data of track deviation caused on the magnetic tape measured;

FIG. 15 is a chart for explaining a procedure to obtain track deviation data of the video tracks and the audio tracks formed in the deeper part of the magnetic layer at the same time;

FIGS. 16(A) and 16(B) are resultant charts when track deviation data of the video tracks and the audio tracks are obtained at the same time, wherein each of them displays ternary data of track deviation on the magnetic tape; and FIG. 17 is a resultant graph obtained when track deviation data of the video tracks and the audio tracks are obtained at the same time, wherein respective curves display data of track deviation on the magnetic tape with respect to the video tracks and the inner audio tracks;

Generally, the track deviation measuring apparatus 100A of the present invention shown in FIG. 5 is comprised of a magnetic recording/reproducing apparatus 10B employing the helical scan system and a personal computer 50, wherein a tape to be tested or a recorded tape 2A on which a video and/or an audio signal is preliminarily recorded in a form FM carrier as the obliquely recorded tracks TP, is obliquely wound around the rotary drum 30 at a predetermined angular range in the magnetic recording/reproducing apparatus 10B, and is driven by being pinched between the pinch-roller 24 and the capstan 22, while rotary heads 34 provided on the rotary drum 30 are rotated together with the rotary drum 30. In this state, by controlling a capstan rotation momentarily, positions of the rotary head 34 relative to the recorded tracks TP are displaced in a longitudinal direction of the recorded tape 2A. This causes the rotary head 34 to move across a recorded track TP vertically as shown in FIG. 7. At every stepwise shifting of the rotary head 34, an amplitude deviation of envelope of video FM signals caused by the track deviation is measured. After that, digital data obtained from the amplitude variation of the video FM signals are processed by the personal computer 50, resulting in a track deviation of the recorded tracks TP on the recorded tape 2A. This method enables to provide a non-destructive measuring for the track deviations of the recorded tracks TP.

As mentioned above, the track deviation measuring apparatus 100A of the first embodiment generally comprises the magnetic recording/reproducing apparatus 10B almost free from the track deviation and the personal computer 50. The personal computer 50 controls various processes, for measuring data of the track deviation of the recorded tracks TP in cooperation with the apparatus 10B and calculates the track deviation, and outputs the resultant calculated track deviation data.

In the above recording/reproducing apparatus 10B except for the track accuracy mentioned above, the tape running system is the same as that of the ordinary recording/reproducing apparatus 10A shown in FIG. 1. Thus, like parts are shown with like reference characters and the detailed description is omitted here.

In the first embodiment of the present invention, the recording/reproducing apparatus 10B and the personal computer 50 are electrically connected through connector cables. Upon manipulation of a keyboard 62 of the personal computer 50 to start measuring the track deviations, an initial statement of "Start of Measuring" is displayed on a display panel (not shown) of the personal computer 50.

Further, a prompt to operate a start button on a control board 48 of the recording/reproducing apparatus 10B is displayed on the display panel thereof. Upon pressing the start button, in the apparatus 10B, a control pulse processing section 44 mentioned hereinafter is electrically disconnected from a capstan servo section 45 by opening a switch SW1, and a conventional auto-tracking system is disabled and a capstan servo section 45 becomes under control of the personal computer 50. Thus, the magnetic recording/reproducing apparatus 10B together with the personal computer 50 is conditioned to conduct the measurement.

Further, by a manipulation of the keyboard 62, it is possible to operate both a first control section 54 of the personal computer 50 in accordance with a measuring program stored in a recording medium D accommodated in the personal computer 50, and a second control section 47 of the apparatus 10B which is electrically connected with the first control section 54 through connectors T17, T7 for accepting control signals from the first control section 54. As the recording medium D, it is possible to use a well known magnetic disc or an optical disc. According to the measuring program, the first controlling section 54 which may be realized by an MPU, controls operation of all the hardware within the personal computer 50 and the apparatus 10B.

Figure 3:
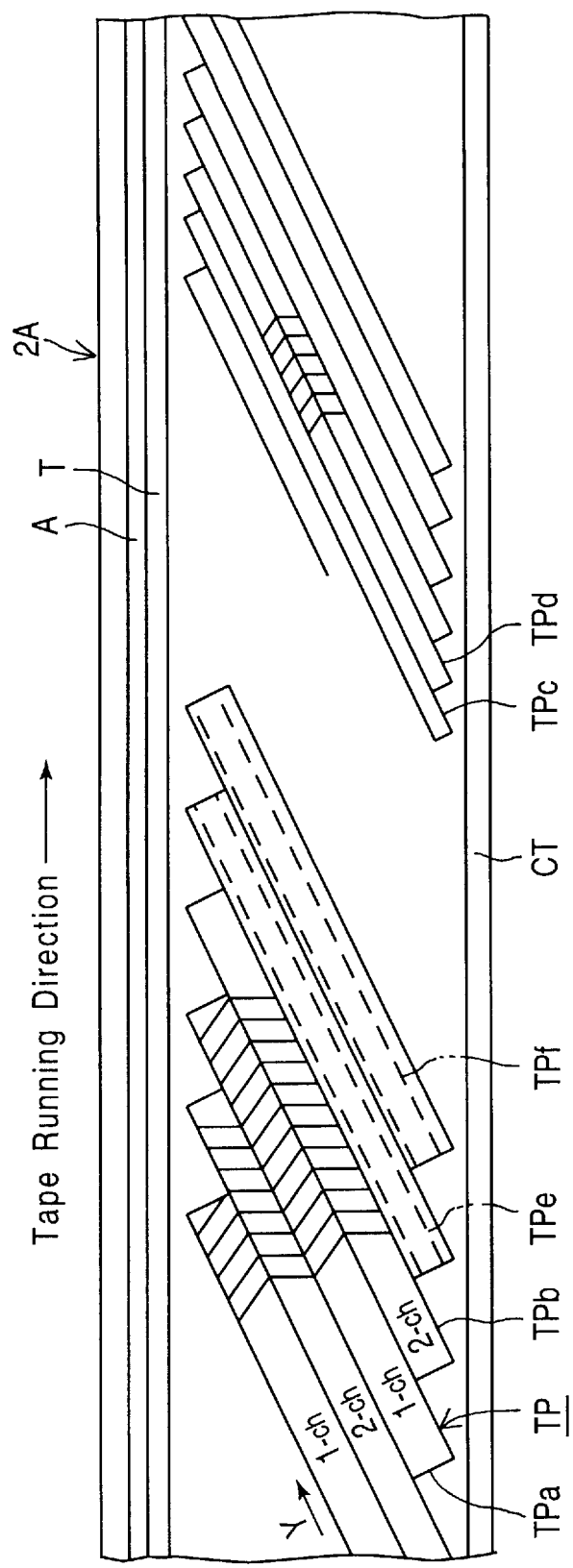
FIG. 3 is a plan view showing a tape pattern having a plurality of recorded tracks formed on a magnetic tape.
Figure 4:
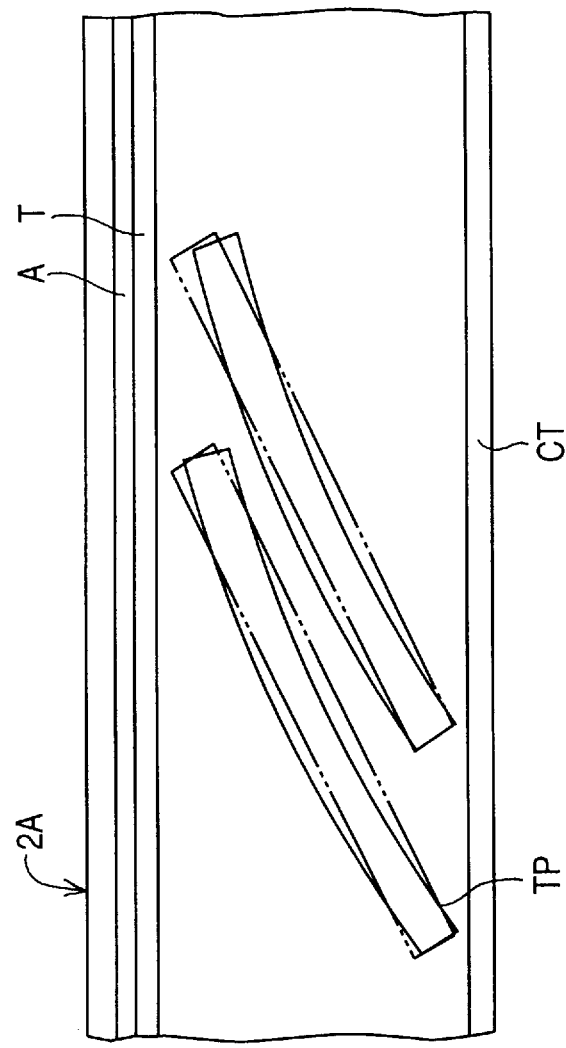
FIG. 4 is a plan view showing track deviations of the recorded tracks on a magnetic tape in the prior art.

Here, the rotary heads 34 provided on the rotary drum 30 are rotated in a direction of an arrow K, and the magnetic tape 2A is driven in a direction of an arrow S by being pinched between the capstan 22 and the pinch-roller 24. The plurality of rotary heads 34 (34*a* to 34*f*) reproduce the signals recorded on the recorded tracks TP (TPa to TPf) of the magnetic tape 2A as shown in FIG. 3 by scanning the recorded tracks TP in a direction of an arrow "Y" which is determined by a running direction of the rotary heads 34 and a relative speed between the magnetic tape 2A and the rotary drum 30. Thus, output signals from the ch-1 and ch-2 SP Mode video heads 34*a*, 34*b* or from the ch-1 and ch-2 EP Mode video heads 34*c*, 34*d* are transmitted to a video signal processing section 41, and output signals from the ch-1 and ch-2 audio heads 34*e*, 34*f* are transmitted to an audio signal processing section 42. In this case, the ch-1 and ch-2 SP Mode video heads 34*a*, 34*b* and the ch-1 and ch-2 EP Mode video heads 34*c*, 34*d* are connected to the video signal processing section 41 through a switch SW2. Thus, the measuring modes of the track deviations regarding the ch-1 and ch-2 SP Mode video tracks TPa, TPb and the ch-1 and the ch-2 EP Mode video tracks TPc, TPd, which are to be measured and are respectively recorded by the ch-1 and ch-2 SP Mode video heads and the ch-1 and ch-2 EP Mode video heads by other recording apparatus are selectively switched based on the command from the keyboard 62 of the personal computer 50 through the second control section 47. Incidentally, the switch SW2 is controlled by the second control section and is positioned depending on a selected mode of SP or EP. And the second control section 47 is a conventional operation controller in a form of micropicocessor (MPU) which normally built into conventional magnetic recording/reproducing apparatuses such as the one denoted as 10B. And in the present invention, the apparatus 10B is slightly modified from conventional one as explained, and the second control section 47 thereof is utilized to interface with the personal computer 50, so that the computer 50 can operate various parts of the apparatus 10B therethrough.

FIG. 6(A) shows H-sync pulses used in the first embodiment of the present invention; and FIG. 6(B) shows sampling pulses obtained from the H-sync pulses shown in FIG. 6(A).

As shown in FIG. 6(A), the video signal processing section 41 provides horizontal synchronizing pulses (referred to as H-sync pulses hereinafter) of 525/2 (262.5) to a sampling pulse generating section 51 of the personal computer 50 through connectors T1, T11 by processing a 1-field (1 V) period video signal reproduced from each of the recorded tracks TP (TPa, TPb) by the rotary heads 34 during ½ rotation of the rotary heads 34 (1-field scanning). And, as shown in FIG. 6(B), the sampling pulse generating section 51 generates sampling pulses of 130 by frequency-dividing the H-sync pulses of 262.5 into about a half thereof.

On measuring the deviations of the recorded tracks TP, amplitude values of FM envelopes of the recorded tracks TP are measured by scanning them with the rotary heads 34 for video and audio signals on the recorded tracks TP. The above sampling pulses are used for determing measuring points on the FM envelopes when the rotary heads 34 scans the tracks from tape inlets to outlets of the rotary drum 36.

FIG. 6(C) shows a 1-field (1 V) period video FM signal or a 1-field (1 V) period audio FM signal in the first embodiment of the present invention.

Further, the video signal processing section 41 provides a 1-field (1 V) period video FM signal shown in FIG. 6(C) which is reproduced from the recorded tracks TP (TPa, TPb), (TPc, TPd) by the rotary heads 34 (34*a*, 34*b*), (34*c*, 34*d*), to the personal computer 50 through connectors T2, T12.

On the other hand, the audio signal processing section 42 provides a 1-field (1 V) period audio FM signal (FIG. 6(C)) produced from the recorded tracks TP (TPe, TPf) by the rotary heads 34 (34*e*, 34*f*) and supplied to the personal computer 50 through connectors T3, T13.

In the personal computer 50, both the video FM signal and the audio FM signal respectively fed to connectors T12, T13 are supplied to an envelop detecting section 52 through a switch SW3.

The switch SW3 can be selectively placed either on the connector T12 side or on the connector T13 side based on the command from the keyboard 62 of the personal computer 50 through the first control section 54. When the track deviations of the recorded tracks TP (TPa, TPb), (TPc, TPd) for the video signal are measured, the switch SW3 is placed on the connector T12 side, and when the track deviations of the recorded tracks TP (TPe, TPf) for the audio signal are measured, the switch SW3 is placed on the connector T13 side. Further, when both the track deviations of the recorded tracks TP (TPa, TPb) or (TPc, TPd) for the video signals and those of the recorded tracks TP(TPe, TPf) for the audio signal are measured, the switch SW3 is alternately changed by the first control section 54 on the basis of a time sharing method. Incidentally, the switch SW3 is normally placed on the video FM signal side.

FIG. 6(D) shows an envelope detected signal obtained from the 1-field (1 V) period video FM signal or the 1-field (1 V) period audio FM signal shown in FIG. 6(C).

The envelope detecting section 52 performs an envelope detection of the video FM signal or the audio FM signal, and outputs an envelope detected signal shown in FIG. 6(D) obtained from the video FM signal or the audio FM signal to an A/D converting section 56.

FIG. 6(E) shows drum-FF pulses generated from a rotary drum driving section 43 in the first embodiment.

Next, the rotary drum 30 is rotated by the rotary drum driving section 43, and the rotary drum driving section 43 outputs one flip flop pulse (referred to as drum-FF pulse hereinafter) per one revolution of the rotary drum 30 to a trigger pulse generating section 53 provided in the personal computer 50 through connectors T4, T14 corresponding to the 1-field (1 V) of the video FM signal or the audio FM signal as shown in FIG. 6(E).

This drum-FF pulse is to be used as a standard pulse for controlling the personal computer 50 in synchronization with the operation of the magnetic recording/reproducing apparatus 10B. During one revolution of the rotary drum 30, the rotary drum driving section 43 alternately outputs an H (high) level and an L (low) level of the drum-FF pulse at every half drum rotation. Here, for instance, a falling edge of the drum-FF pulse is utilized to set up a standard signal for measuring the track deviations of channel-1 of the rotary heads 34 (34a, 34c, 34e). On the other hand, a rising edge of the drum-FF pulse is utilized to set up the standard signal for that of channel-2 of the rotary heads 34 (34b, 34d, 34f).

In this case, the selection of a specified channel of the rotary heads 34 is determined by the command from the keyboard 62 of the personal computer 50. After the selection of the channel, the measurement of the track deviation is performed depending on the measurement program installed in the recording medium "D".

FIG. 6(F) shows a start pulse generated by a first control section in the first embodiment; and FIG. 6(G) shows a trigger pulse generated by a trigger pulse generation section 53 in the first embodiment.

Responsive to a start pulse shown in FIG. 6(F) outputted from the first control section 54, the trigger pulse generating section 53 generates the trigger pulse shown in FIG. 6(G) corresponding to the falling edge of the drum-FF pulse to allow the channel-1 of the rotary heads 34 (34a, 34c, 34e) to measure the track deviation of the ch-1 recorded tracks TP (TPa, TPc, TPe), wherein the trigger pulse is generated only one pulse.

In the same manner as mentioned above, the trigger pulse for measuring the track deviation of the ch-2 recorded tracks TP (TPb, TPd, TPf) is generated corresponding to the rising edges of the drum-FF pulses to allow the channels 2 of the rotary heads 34 (34b, 34d, 34f) to measure the track deviation of the ch-2 recorded tracks TP (TPb, TPd, TPf).

FIG. 6(H) shows a control pulse reproduced from a control track in the first embodiment; and FIG. 6(I) shows a phase-shifted control pulse obtained from the control pulse shown in FIG. 6(H) by being phase-shifted.

Next, the AC head 25 reproduces audio signals and control signal from the audio tracks A and T at a top edge of the magnetic tape 2A (FIG. 3) and the control track CT at a lower edge thereof. When the control signal is reproduced by the AC head 25, one control pulse is outputted during 1-frame (2-fields) period through the control pulse processing section 44, and the control pulse is inputted to a control pulse phase-shifting section 55 of the personal computer 50 through connectors T5, T15.

And, as shown in FIG. 6(I), the control pulse phase-shifting section 55 shifts the phase of the control pulse corresponding to a predetermined shift value for the rotary heads 34 which value is directed by the first control section 54 as will be explained hereinafter. The phase-shifted control pulse is inputted to the capstan servo section 45 of the magnetic recording/reproducing apparatus 10B through connectors T6, T16.

Incidentally, when no measurements are conducted, the control pulse from the control pulse processing section 44 is directly inputted to the capstan servo section 45 through the switch SW1, resulting in the normal recording/reproducing.

The capstan servo section 45 inputs the phase-shifted control pulse to a capstan motor 46 for driving the capstan 22. Here, a rotational speed of the capstan 22 is slightly shifted through the capstan motor 46 because of the phase-shifted control pulse. Thus, the tape speed of the magnetic tape 2A pinched between the capstan 22 and the pinch roller 24 is slightly changed as well. Thereby, a positional relation between the magnetic tape and the rotary heads 34 provided on the upper rotary drum 33 is changed or shifted with respect to a longitudinal direction of the magnetic tape 2A. This relative shifting of the magnetic tape 2A to the rotary heads 34 signifies a shifting of the rotary heads 34 to the magnetic tape 2A.

Accordingly, it is possible to stepwise shift the rotary heads 34 to the magnetic tape 2A in the longitudinal direction thereof by causing the first control section 54 to output stepwise a shifting value to the capstan motor 46. Here, rotary head shifting system for shifting the rotary heads 34 comprises the capstan 22, the pinch roller 24, the AC head 25, the control pulse processing section 44, the capstan servo section 45 and the capstan motor 46 of the magnetic recording/reproducing apparatus 10B, and the first control section 54 and the control pulse phase-shifting section 55 of the personal computer 50.

Next, among the basic operations for measuring the track deviation, an explanation is given of an operation for stepwise shifting or tracking the rotary heads 34 in the longitudinal direction of the magnetic tape 2A and another operation for stepwise measuring values of FM envelopes, wherein the amplitude values of the FM envelopes are obtained by envelope-detecting the video FM signal (or the audio FM signal) reproduced by the rotary heads 34 at a plurality of video FM measuring points (or audio FM measuring points) set up along the recorded tracks TP at every head shifting, referring to FIGS. 5 to 8.

In the description below, an exemplary ch-1 SP Mode video head 34a is employed for measuring the track deviation of an exemplary ch-1 SP Mode video track TPa. The measurement of the track deviation of the ch-2 SP Mode video recorded track TPb is performed in the same manner as mentioned above by the ch-2 SP Mode video head 34b. Thus, the description for the latter is omitted here.

In the case of the measurement of the track deviations of the ch-1 and ch-2 EP Mode video tracks TPc, TPd produced by the ch-1 and ch-2 EP Mode video heads 34c, 34d, the switch SW2 is placed on the EP Mode side. Thus, the description is omitted here.

Further, in the case of the measurement of the track deviations of the ch-1 and ch-2 audio tracks TPe, TPf produced by the ch-1 and ch-2 audio heads 34e, 34f, the switch SW3 is placed on the audio FM signal side. Thus, the description is omitted here.

Furthermore, in the case of the measurement of the track deviations of both the ch-1 SP Mode video tracks TPa and the ch-1 audio tracks TPe, the description will be given hereinafter.

As shown in FIG. 7, the ch-1 SP Mode video head 34a among the rotary heads 34 is stepwise shifted relatively in a direction orthogonal to the ch-1 SP Mode video track TPa as a result of the abovementioned longitudinal rotary head shifting manner, wherein the direction orthogonal to the ch-1 SP Mode video track TPa is defined as an X axis and a scanning direction of the 1-ch SP Mode video head 34a on the ch-1 SP Mode video track TPa is defined as a Y axis on the magnetic tape 2A. Here, the ch-1 SP Mode video head 34a has an azimuth angle capable of reproducing the ch-1 SP Mode video track TPa. Thus, the ch-1 SP Mode video head 34a can reproduce the video FM signal from the ch-1 SP Mode video track TPa, but it can not reproduce the video FM signal from the ch-2 SP Mode video track TPb because of a different azimuth angle thereof.

First, the description is given of a shifting amount of the ch-1 SP Mode video head 34a.

When the shifting amount of the ch-1 SP Mode video head 34a is zero, the ch-1 SP Mode video head 34a is located at an initial shift position (or a preset shift position) Xo, wherein a center of the ch-1 SP Mode video head 34a coincides with a center line of a standard track having no track deviation of the ch-1 SP Mode video track TPa. The "standard track" means a track having its position and slant angle specified in an industry standard of such as VHS system. In case of the VHS system the position of the track is defined as the distance between the drum-leaving end (end of recording) of the track and the position of the control head gap for recording the control pulse which controls the head position. And the slant angle is defined as the angle subtended by the track and the bottom edge (adjacent to the control track) of the tape.

According to the well-known VHS or S-VHS standard, a track width of each of the ch-1 and ch-2 SP Mode video tracks TPa, TPb is specified as 58 μm. Thus, the shifting amount of the ch-1 SP Mode video head 34a is determined to be within a predetermined range, taking account of the above width.

In this first embodiment, the range of the shifting amount of the ch-1 SP Mode video head 34a is determined to be +80 μm from the initial shift position Xo. In other words, the range of the shifting amount of the ch-1 SP Mode video head 34a is determined to be 2.75 times as large as the track width of 58 μm of the ch-1 SP Mode video track TPa in this case. However, the range thereof can be optionally determined.

Upon an operation of shifting the ch-1 SP Mode video head 34a, the position of the ch-1 SP Mode video head 34a is initialized to be located at the initial shift position Xo. Then, the ch-1 SP Mode video head 34a is shifted by −80 μm to a minus maximum shift position "X−80". After that, the ch-1 SP Mode video head 34a is stepwise shifted at a predetermined interval (for instance, an offset value of 2 μm) to a plus maximum shift position "X+80" via the initial shift position Xo. Specifically, the ch-1 SP Mode video head 34a is orderly shifted to shift positions of X−80, X−78, ..., X−2, ... Xo, X+2, ... X+78, X+80.

In the above, the ch-1 SP Mode video head 34a is controlled not to be shifted to a next shift position by the control section 54 until the ch-1 SP Mode video head 34a has completed scanning of at least one ch-1 SP Mode video track TPa. Further, the shift interval is determined so that the ch-1 SP Mode video head 34a never fail to be located at the initial shift position Xo, for instance, the offset value of 2 μm.

After the ch-1 SP Mode video head 34a is shifted to a certain shift position, the ch-1 SP Mode video head 34a scans the track TPa to output video FM signals at a plurality of video FM measurement points set up along the ch-1 SP Mode video track TPa so that the amplitude values of the FM envelope are obtained by envelope-detecting the outputted video FM signals. The plurality of video FM measurement points are determined in accordance with the timing of the sampling pulses outputted from the sampling pulse generating section 51 as shown in FIG. 7.

Specifically, in the first embodiment, the plurality of video FM measuring points are orderly determined as Y(0), Y(1), Y(2) ... Y(129) from the scanning start to the scanning end of the ch-1 SP Mode video head 34a in accordance with the timing of 130 sampling pulses generated per one field (1 V).

Next, the description is given of a variation of the FM envelope when a video head is stepwise shifted from the minus maximum shift position X−80 to the plus maximum shift position X+80, referring to FIGS. 8-(1) through 8-(9).

Referring to FIG. 8-(1), reference characters TPa (n-1), TPb (n-1), TPa (n) are provided to clarify positional relations regarding the ch-1 SP Mode video track TPa and the ch-2 SP Mode video track TPb which are adjacent to each other, wherein the ch-2 SP Mode video track TPb (n-1) is recorded by being interposed between the adjacent ch-1 SP Mode video tracks TPa (n-1) and TPa (n). In the reference characters TPa (n-1), TPb (n-1), TPa (n), the subsidiary reference characters (n-1) and (n) denote that they are orderly disposed on the magnetic tape 2A with respect to a certain channel (ch). In FIGS. 8-(1) through 8-(9), the subsidiary reference characters (n)–(v) are provided for convenience' sake on the magnetic tape 2A.

It is noted that upon measuring a track deviation of, for instance, the ch-1 SP Mode video track TPa with the ch-1 SP Mode video head 34a, a relative positional relation between the ch-1 SP Mode video track TPa and the ch-1 SP Mode video head 34a is always held, though the magnetic tape 2A runs at a constant speed. In other words, it is possible to start measuring any track to which the ch-1 SP Mode video head 34a is shifted and held at the shifted position.

In FIGS. 8-(1) to 8-(9), the description is given of a case where the track deviation of the ch-1 SP Mode video track TPa is measured. Further, the width of the ch-1 SP Mode video track TPa is made to be 58 μm, and the track width of the ch-1 SP Mode video head 34a is made to be approximately the same as that of the ch-1 SP Mode video track TPa. Further, when obtaining the values of the FM envelope, the amplitude values are actually obtained as mean values of the plurality of the FM envelopes detected from a plurality of video FM signals reproduced from a plurality of the ch-1 SP Mode video tracks TPa at a certain shifting position. However, the description of repeated measurement operations to obtained the mean values is omitted for simplicity.

The operations of the measurement are as follows:

(1) As shown in FIG. 8-(1), after the position of the 1-ch SP Mode video head 34a is initialized to the initial shift position Xo, the ch-1 SP Mode video head 34a is shifted to the minus maximum shift position X−80 in a reverse direction of an arrow (X). While the magnetic tape 2A runs generally in a direction of an arrow (Y), the ch-1 SP Mode video head 34a scans partially, in the direction of the arrow (Y), the ch-1 SP Mode video track TPa (n-1) which is positioned before the ch-1 SP Mode video track TPa (n). Thus, the video FM signal corresponding to a hatched area is reproduced from the ch-1 SP Mode video head 34a.

(2) As shown in FIG. 8-(2), the ch-1 SP Mode video head 34a is shifted to the shift position X−60 in a direction of the arrow (X). While the magnetic tape 2A generally runs in the direction of the arrow (Y), the video head 34a scans partially, in the direction of the arrow (Y), the ch-1 SP Mode video track TPa (o-1), the ch-2 SP Mode video track TPb (o-1) and the ch-1 SP Mode video tracks TPa (o). At this shift position X−60, the ch-1 SP Mode video head 34a scans partially the ch-2 SP Mode video track TPb (o-1) of which the recorded azimuth angle is different from the azimuth angle of the ch-1 SP Mode video head 34a, so that the video FM signal is not outputted from the ch-2 SP Mode video track TPb(o-1). Thus, the video FM signal corresponding to slightly hatched areas of the ch-1 SP Mode video tracks TPa (o-1) and TPa (o) is reproduced from the ch-1 SP Mode video head 34a.

(3) As shown in FIG. 8-(3), the ch-1 SP Mode video head 34a is shifted to the shift position X−40. The ch-1 SP Mode video head 34a scans partially the ch-2 SP Mode video track TPb (p-1) and the ch-1 SP Mode video tracks TPa (p). At this shift position X−40, the video FM signal corresponding to hatched areas of the ch-1 SP Mode video tracks TPa (p) is reproduced from the ch-1 SP Mode video head 34a.

(4) As shown in FIG. 8-(4), the ch-1 SP Mode video head 34a is shifted to the shift position X−20. The ch-1 SP Mode video head 34a scans partially the ch-1 SP Mode video track TPa (q). At this shift position X−20, the video FM signal corresponding to hatched area of the ch-1 SP Mode video track TPa (q) is reproduced from the ch-1 SP Mode video head 34a.

(5) As shown in FIG. 8-(5), the ch-1 SP Mode video head 34a is returned to the initial shift position Xo. The 1-ch SP Mode video head 34a scans almost all over the ch-1 SP Mode video track TPa (r). At this shift position Xo, the video FM signal corresponding to hatched area of almost all the ch-1 SP Mode video tracks TPa (r) is reproduced from the ch-1 SP Mode video head 34a.

(6) As shown in FIG. 8-(6), the ch-1 SP Mode video head 34a is shifted to the shift position X (+20). The ch-1 SP Mode video head 34a scans partially the ch-1 SP Mode video track TPa (s). At this shift position X(+20), the video FM signal corresponding to the hatched area of the ch-1 SP Mode video tracks TPa (s) is reproduced from the ch-1 SP Mode video head 34a.

(7) As shown in FIG. 8-(7), the ch-1 SP Mode video head 34a is shifted to the shift position X+40. The ch-1 SP Mode video head 34a scans partially the ch-1 SP Mode video track TPa (t) and the ch-2 SP Mode video track TPb(t). At this shift position X+40, the video FM signal corresponding to hatched area of the ch-1 SP Mode video track TPa (t) is reproduced from the ch-1 SP Mode video head 34a.

(8) As shown in FIG. 8-(8), the ch-1 SP Mode video head 34a is shifted to the shift position X+60. The ch-1 SP Mode video head 34a scans partially the ch-1 SP Mode video track TPa (u) and ch-2 SP Mode video track TPb(u) and the ch-1 SP Mode video track TPa (u+1) which is positioned behind the 1-ch SP Mode video track TPa (u). At this shift position X+60, the video FM signal corresponding to hatched areas of the ch-1 SP Mode video tracks TPa (u) and TPa (u+1) is reproduced from the ch-1 SP Mode video head 34a.

(9) As shown in FIG. 8-(9), the ch-1 SP Mode video head 34a is shifted to the plus maximum shift position X+80. The ch-1 SP Mode video head 34a scans partially the ch-1 SP Mode video track TPa (v+1) which is behind the ch-1 SP Mode video track TPa(v). At this plus maximum shift position X+80, the video FM signal corresponding to hatched areas of the 1-ch SP Mode video track TPa (v+1) is reproduced from the ch-1 SP Mode video head 34a. When the scanning at the plus maximum shift position X+80 is over, all the data of the video FM signal are acquired.

As mentioned above, when the ch-1 SP Mode video head 34a is stepwise shifted as shown in FIGS. 8-(1) to 8(9), the amplitude values of the FM envelope obtained by envelope-detecting the obtained video FM signals vary depending on the positions where the track deviations are developed. It will be understood that this variation corresponds to the hatched areas shown in FIGS. 8-(1) to 8(9).

Referring to FIG. 5 again, when the data of the video FM signal is acquired into the personal computer 50 by causing the ch-1 SP Mode video head 34a to stepwise shift and to scan each of the recorded tracks, the acquisition of the data of the video FM signal is started by a trigger pulse generated by the trigger pulse generating section 53, and the ch-1 SP Mode video head 34a is shifted from the initial shift position Xo to the minus maximum shift position X−80. While the ch-1 SP Mode video head 34a is shifted from the minus maximum shift position X−80 to the plus maximum shift position X+80, the FM envelope signals obtained by envelope-detecting the video FM signals are outputted in a shifting order, from the envelope detecting section 52 as shown in FIG. 9, and are inputted to the A/D converting section 56.

In the A/D converting section 56, the FM envelope signals are A/D-converted in accordance with the timing of the sampling pulse generated by the sampling pulse generating section 51. Specifically, the amplitude values of the FM envelope at the plurality of video FM measuring points Y(0) to Y(129) are respectively converted into digital data and the digital data are inputted to a track deviation data forming section 57. The track deviation data forming section 57 is provided with a memory section 57a and a first arithmetic section 57b. The data transferred from the A/D converting section 56 are arranged as shown in FIG. 10 and are temporarily stored in the memory section 57a. On the other hand, the 1st arithmetic section 57b produces track deviation data by arithmetically processing the data from the memory section 57a as follows.

Here, the description is given in detail of the procedure for producing the track deviation data in the arithmetic section 57b, referring to FIGS. 5, 11(A), 11(B), 12(A) and 12(B), which is one of the main features of the present invention.

First, in the 1st arithmetic section 57b of the track deviation forming section 57, the digital data acquired at every video FM measuring points Y(0) to Y(129) are rearranged in a different manner from the arrangement in the memory section 57a as mentioned below.

FIG. 11(A) schematically shows a more simplified shifting operation of the ch-1 SP Mode video head 34a compared with FIGS. 8-(1) to 8-(9).

In FIG. 11(A), the recorded tracks depicted with two-dotted lines are standard tracks having no track deviation and ones depicted with real lines have track deviations.

Further, arrow marked positions represented by ①, ②, ③, ④ and ⑤ show the shift positions of the ch-1 SP Mode video head 34a. The ch-1 SP Mode video head 34a scans the ch-1 SP Mode video track TPa along directions of the arrows. Here, the reference characters Xo denote the initial shift position of the ch-1 SP Mode video head 34a which corresponds to a center of the standard recorded track.

When the ch-1 SP Mode video head 34a scan the ch-1 SP Mode video track TPa, a part of the ch-1 SP Mode video track TPa corresponding to a video FM measuring point (a) is assumed to be free from the track deviation. Part of the 1-ch SP Mode video track TPa corresponding to a video FM measuring point (b) is assumed to be slightly deviated away in a direction of a plus + side from the standard track. Part thereof corresponding to a video FM measuring point (c) is assumed to be largely curved in the direction of the plus + side from the standard track.

FIG. 11(B) is a diagram for explaining the arrangement of digital data acquired on the basis of a method shown in FIG. 11(A). In FIG. 11(B), an abscissa represents shift directions of the ch-1 SP Mode video head 34a and an ordinate represents video FM levels (amplitude values of FM envelope signals).

Thus, in the 1st arithmetic section 57b of the track deviation data forming section 57, the digital data acquired at every video FM measuring points Y(0) to Y(129) are rearranged in the abovementioned manner.

As seen from FIG. 11(B), through the head shift positions ① through ⑤, there occurs always a maximum video FM level presentation at every video FM measuring point (a), (b) or (c). Further, the head shift position at which the maximum video FM level occurs different depending on the FM measuring points (a), (b) or (c).

Specifically, at the video FM measuring point (a), the head shift position, at which the maximum video FM level occurs, approximately coincides with the initial shift position ① because the pattern of the ch-1 SP Mode video track TPa approximately agrees with the pattern of the standard track having no track deviation. At the video FM measuring point (b), the head shift position, at which the maximum video FM level occurs, is slightly deviated by δ1 from the initial shift position Xo in a (+) direction on the abscissa (X) because the pattern of the ch-1 SP Mode video track TPa is slightly curved in a (+) direction away from the pattern of the standard track as shown in FIG. 11(A). At the video FM measuring point (c), the head shift position, at which the maximum video FM level occurs, is largely deviated by δ2 from the initial shift position Xo in the (+) direction on the abscissa (X) because the pattern of the ch-1 SP Mode video track TPa is largely curved in a (+) direction away from the pattern of the standard track.

In the above, when the pattern of the ch-1 SP Mode video track TPa is curved in a (−) direction to the pattern of the standard track, a deviation value (or displacement value) δ is generated in a (−) direction on the abscissa (X). However, the illustration is omitted here.

After obtaining the deviation values δ each defined as a deviation value from the initial shift position Xo to a shifted position at which the maximum video FM level occurs at a certain video FM measuring point, it is possible to determine a state of the overall track deviation referred to the standard track by obtaining a locus of the deviation values δ represented at a plurality of the video FM measuring positions. And, in the present invention, the deviation values δ of the plurality of the video FM measuring points are obtained by the calculation in the 1st arithmetic section 57b of the track deviation data forming section 57.

Further, in FIG. 11(B), it is verified from experiments that the video FM level change as a function of the head shift positions ① through ⑤, exhibits a symmetrical figure horizontally with respect to a peak thereof. In other words, the video FM maximum level resides on a vertex of the symmetrical figure thereof. This relation is utilized to obtain, by calculation, the head shift position of the ch-1 SP Mode video head 34a corresponding to the video FM maximum level.

Next, the description is given in detail of the procedure for calculating the shift position of the ch-1 SP Mode video head 34a which causes the video FM maximum level at a certain video FM measuring point, referring to FIGS. 12(A) and 12(B).

FIG. 12(A) is a diagram for explaining the arrangement of digital data in the same manner as shown in FIG. 11(B), wherein a track width of a recording head is approximately the same as that of a reproducing head; and FIG. 12(B) is a diagram for explaining the arrangement of digital data in the same manner as shown in FIG. 11(B), wherein a track width of the recording head is narrower than that of the reproducing head. In FIGS. 12(A) and 12(B), the abscissa represents the shift directions of the ch-1 SP Mode video head 34a and the ordinate represents the video FM levels (amplitude values of FM envelope signals) as mentioned in the foregoing.

As shown 12(A), when the track width of the recording head is approximately the same as that of the reproducing head, the reproducing characteristics by the reproducing head is distinctive. That is, the video FM maximum level (peak) among the the plural digital data clearly appears. However, as shown in 12(B), when the track width of the recording head is narrower than that of the reproducing head, the reproducing characteristics by the reproducing head does not exhibit a clear peak. Thus, it is difficult to determine an exact head shift position causing the video FM maximum level from the comparison among the plural digital data as will be understood from the symmetry of the figure.

In the present invention, to increase a reliability of the measurement, a mean value principle of the digital data is employed by repeatedly scanning the plural ch-1 SP Mode video tracks TPa at a certain shift position.

Further, upon calculating the shift position which causes the video FM maximum level, first, a maximum value is selected among all the plural digital data, and a minimum value is selected among data plotted in a left side of the graphs with respect to the initial shift position Xo in FIGS. 12(A) and 12(B). Next, there are determined a point ① having an output level of 85% to the maximum value and a point ② having an output level "SL" represented by the following formula (1).

$$SL=\{(\text{maximum value}-\text{minimum value})\times 15/100+\text{minimum value}\} \quad (1)$$

Then, a linear line L1 connecting the points ① and ② is obtained by causing the plural digital data obtained from the plural scans of the ch-1 SP Mode video heads 34a and by a conventional "method of least squares".

Next, a minimum value is also selected among data plotted in the right side of the graph with respect to the initial shift position Xo, and a point ③ having an output level of 85% to the maximum value and a point ④ having an output level "SL" represented by the formula (1). Then, a linear line L2 connecting the points ③ and ④ is obtained by causing the plural digital data obtained from the plural scans of the ch-1 SP Mode video heads 34a and by the "method of least squares" as well. Further, an intersection ⑤ of the linear lines L1 and L2 is obtained.

It are noted that the linear lines L1 and L2 are approximately symmetrical to the intersection ⑤. As mentioned in the foregoing, the video FM maximum level coincides with the vertex of the symmetrical figure. Accordingly, the digital data of the intersection ⑤ becomes the maximum value, and an intersection of a vertical line passing through the intersection ⑤ and the abscissa becomes the shift position of the ch-1 SP Mode video head 34a which causes the maximum value.

Accordingly, the deviation value δ from the initial shift position Xo to the shifting position of the ch-1 SP Mode video head 34a causing the video FM maximum level (the intersection ⑤) becomes a track deviation data obtained from a certain video FM measuring point.

In the same manner as mentioned in the above, other deviation values (or track deviation data) δ are obtained at other video FM measuring points. Here, the values of the track deviation data δ may be different from each other, and each of the values thereof has either a (+) value or a (−) value with respect to the initial shift position Xo. Accordingly, it is possible to evaluate the track deviation of the recorded track by obtaining a locus of the plurality of the track deviation data δ. These obtained results are stored in the track deviation data storing section 58.

Operation of the measurement apparatus including the data processing in the foregoing are carried out according to the program stored in the recording medium "D" by the 1st control section 54 which may be realized by an MPU.

These track deviation data δ stored in the track deviation data storing section 58 can be selectively displayed either in a ternary manner as shown in FIGS. 13(A) and 13(B) or in a manner as shown in FIGS. 14(A) and 14(B) responsive to an output from an output section 61 as will be explained hereinafter.

FIGS. 13(A) and 13(B) are resultant charts obtained, each displaying whole track deviation data ternary, i.e., the FM envelope level in relation to the head scanning and displacement directions, wherein FIG. 13(A) shows a resultant chart when the track deviation is small, and FIG. 13(B) shows a resultant chart when the track deviation is larger.

FIGS. 14(A) and 14(B) are graphs, each displaying track deviation data of the magnetic tape measured, wherein FIG. 14(A) shows resultant curves of ch-1 and ch-2 video tracks when the track deviations are small, and FIG. 14(B) shows resultant curves of ch-1 and ch-2 video tracks when the track deviations are larger.

In the above, the magnetic recording/reproducing apparatus 10B is preliminarily adjusted so that the track deviation is minimized. However, it is impossible technically to make the track deviation to be zero. Accordingly, in the present invention, the track deviation caused at the adjusted state of the apparatus 10B (or an initial state) is calibrated in the conventional manner by using a microscope as explained for the prior art. The obtained data inherent to the apparatus 10B are stored in a track deviation compensation data memory section 59 in the same data form as mentioned in the foregoing. Needless to say, it is unnecessary to provide the track deviation compensation data memory section 59 when the apparatus 10B can be adjusted to no track deviation.

As a result, it is possible to display compensated data in a visible manner as shown in FIGS. 13(A) and 13(B) or in FIGS. 14(A) and 14(B) by subtracting the track deviation compensation data from the obtained track deviation data δ in a second arithmetic section 60 of the personal computer 50.

In the presentation forms of the track deviation data in FIGS. 13(A) and 13(B), an abscissa represents a shift direction of the video head and an ordinate represents a scanning direction of the video head and the video FM level. Thus, it is possible to display the track deviation data ternary allowing an evaluation of the measured data in a visible manner.

On the other hand, in the presentation forms of the track deviation data in FIGS. 14(A) and 14(B), an abscissa represents a scanning direction of the video head and an ordinate represents the track deviation data δ, wherein an acceptable range is also presented. Thereby, it is possible to evaluate in a visible manner if the track deviation data δ are within the acceptable range according to the standard. In FIGS. 14(A) and 14(B), both the ch-1 SP Mode video track TPa and the ch-2 SP Mode video track TPb are shown.

Next, the description is given of the procedure of the track deviation measuring method, referring to FIGS. 5, 7, 8, 12, 13 and 14.

(1) Step 1: The recorded magnetic tape 2A is installed in the magnetic recording/reproducing apparatus 10B adjusted so as not to have the track deviation.

Further, upon starting the measurement, the program mentioned before for measuring the track deviation corresponding to each step is preliminarily stored in the recording medium "D" provided in the personal computer 50. When a command for starting is inputted to the personal computer 50 through the keyboard 62 of the personal computer 50, a display of "starting" is presented on a display panel (not shown). Then, according to an instruction displayed on the display panel, the magnetic recording/reproducing apparatus becomes possible to be operated by separating the control pulse processing section 44 from the capstan servo section 45 by opening the switch SW1 through the control board 48 of the apparatus 10B, so that a conventional automatic control circuit (not shown) is disabled and a capstan servo section 45 becomes under control of the personal computer 50.

Here, the description is given of a case where the switch SW2 is placed on the SP Mode side, and the switch SW3 is placed on the video FM signal side, and either of the ch-1 SP Mode video heads 34a, 34b is selected from the video heads 34.

(2) Step 2: The magnetic tape 2A is moved by being helically wound around the rotary drum 30.

(3) Step 3: The ch-1 SP Mode video head 34a, for instance, is initialized to be shifted to the initial shift position Xo.

(4) Step 4: The ch-1 SP Mode video head 34a is shifted to the minus maximum shift position X−80.

(5) Step 5: The ch-1 SP Mode video head 34a is stepwise shifted from the minus maximum shift position X−80 to shift position X−78, ..., X−2, Xo, X+2, ..., X+78 and the plus maximum shift position X+80. At respective head shift position, the values of the video FM signal levels are measured at the plural video FM measuring points set up along the ch-1 SP Mode video track TPa scanned by the ch-1 SP Mode video head 34a, and are outputted as the amplitude values of the FM envelope from the envelope detecting section 52. These amplitude values of the FM envelope are converted to digital data by the A/D converting section 56, and are temporarily stored in the memory section 57a of the track deviation data forming section 57.

(6) Step 6: After the digital data stored in the memory section 57a are re-arranged by the 1st arithmetic section 57b, according to the measuring procedure previously explained with FIGS. 12(A), 12(B), the shift position of the ch-1 SP Mode video head 34a which causes the maximum value among the plural digital data at a certain video FM measuring point, is calculated. Other shift positions of the ch-1 SP Mode video head 34a which causes the maximum values are also calculated in the same manner as mentioned in the above. Further, the deviation values δ from the initial shift position Xo are respectively calculated, resulting in the track deviation data 67 equivalent to the displacement values δ.

(7) Step 7: The track deviation compensated data are obtained by subtracting the track deviation compensation data preliminarily stored in the track deviation compensation data memory section 59, from the track deviation data δ.

(8) Step 8: The compensated track deviation data are outputted from an output section 61 in a manner shown in FIGS. 13(A), 13(B) or 14(A), 14(B).

In the case of measuring the track deviations of the ch-1 and ch-2 EP Mode video recorded tracks TPc, TPd, it is possible to measure them by placing the switch SW2 on the EP Mode side.

Figure 2:
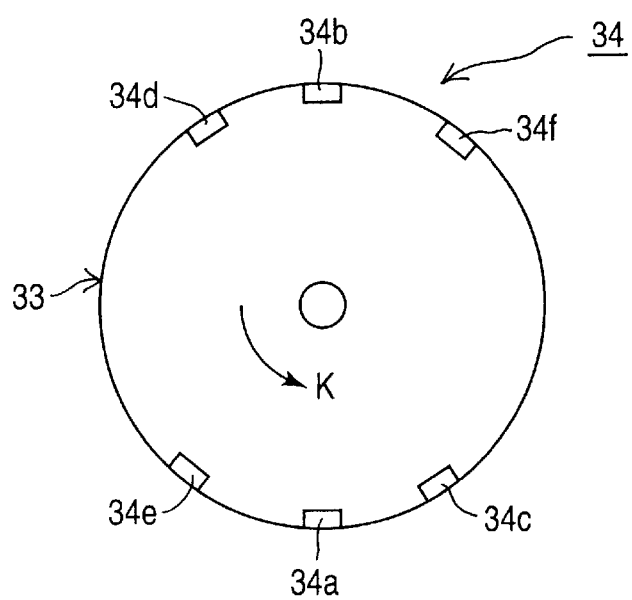
FIG. 2 is a plan view showing magnetic heads installed in a rotary drum in the prior art shown in FIG. 1.

Further, by placing the switch SW3 on the audio FM signal side, it is possible to measure the track deviations of the ch-1 and ch-2 audio tracks TPe, TPf of either the SP Mode or the EP Mode through the SW2. Here, as shown in FIG. 2 in the prior art, the ch-1 and ch-2 audio heads 34e, 34f are provided on the upper rotary drum 33 by being largely separated from the ch-1 and ch-2 SP Mode video heads 34a, 34b and the ch-1 and ch-2 EP Mode video heads, 34c and 34d. Thus, in the present invention, the measurement program is preliminarily arranged so that a part of data obtained by the ch-1 audio head 34e, for instance, corresponding to the separation distance between the ch-1 audio head 34e and the ch-1 SP Mode video head 34a, for instance, can be removed from the obtained data. The amount of removal of the data can be optionally set up by changing a part of the measurement program.

Next, referring to FIGS. 5 and 15 through 18, the description is given of a measuring procedure employing the time sharing control method, wherein both the video recorded track and the corresponding audio recorded track are measured together by alternately placing the switch SW3 on the connector 12 or 13.

It is noted that FIGS. 15, 16(A) or 16(B), and 17 respectively correspond to FIGS. 12(A) or 12(B), 13(A) or 13(B), and 14(A) or 14(B) in the foregoing. Thus, the explanation of FIGS. 15 through 17 is given where necessary.

The procedure thereof is as follows:

(1) Step 11: It is set up that the track deviations of, for instance, both the ch-1 SP Mode video track TPa and the ch-1 audio track TPe can be measured together by operating the keyboard 62 of the personal computer 50. Thereby, the switch SW3 is alternately switched on the connector T12 side for the video FM signal input or the connector T13 side for the audio FM signal input by the first control section 54 depending on the measuring program stored in the recording medium D in the personal computer 50. Here, the switching of the switch SW3 is alternately performed time divisionally between the ch-1 SP Mode video head 34a and the ch-1 audio head 34e.

(2) Step 12: The magnetic tape 2A is transported by being helically wound around the rotary drum 30.

(3) Step 13: The ch-1 SP Mode video head 34a and the ch-1 audio head 34e are initialized to be shifted to the initial shift position Xo. Here, the shifting operation of the both heads 34a, 34e are performed by the control pulses of which the phases are displaced. Thus, the both heads 34a, 34e are shifted together. In this regard, the program is set up so that a part of the data which corresponds to the separation distance between the ch-1 audio head 34e and the ch-1 SP Mode video head 34a, obtained from the audio FM measuring point by the ch-1 audio head 34e, can be removed therefrom.

(4) Step 14: The ch-1 SP Mode video head 34a and the ch-1 audio head 34e are shifted to the minus maximum shift position X−80.

(5) Step 15: After placing the switch SW3 on the connector T12 for the video FM signal input, the amplitude valudes of the video FM signals are measured at the plural video FM measuring points set up along the ch-1 SP Mode video track TPa scanned by the ch-1 SP Mode video head 34a, and are outputted as the values of the FM envelope from the envelope detecting section 52. These amplitude values of the FM envelope are converted to digital data by the A/D converting section 56, and are temporarily stored in the memory section 57a of the track deviation data forming section 57.

Then, after placing the switch SW3 on the connector T13 for the audio FM signal input, the amplitude values of the audio FM signals are measured at the plural audio FM measuring points set up along the ch-1 SP Mode audio track TPe scanned by the ch-1 audio head 34e, and are outputted as the amplitude values of the FM envelope from the envelope detecting section 52. These amplitude values of the FM envelope are converted to digital data by the A/D converting section 56, and are temporarily stored in the memory section 57a of the track deviation data forming section 57. Here, both an audio digital data memory domain and a video digital data memory domain are provided in the memory section 57a.

Then, after the both heads 34a, 34e are shifted to the shift position X−78, the amplitude values of audio and video FM envelopes are alternately measured and temporarily stored in the memory section 57a. These operation are continued until the both heads 34a, 34e come to the plus maximum shift position X+80.

(6) Step 16: After the audio digital data and the video digital data stored in the memory section 57a are rearranged in the arithmetic section 57b, according to the measuring procedure as shown in FIG. 15, which has been explained by using FIGS. 12(A), 12(B), the shift positions of the ch-1 SP Mode video head 34a and the ch-1 audio head 34e which causes the maximum values among the plural digital data at certain video and audio FM measuring points, are calculated. Other shift positions of the ch-1 SP Mode video head 34a and the ch-1 audio head 34e causing the maximum values are also calculated in the same manner as mentioned in the above. Further, the deviation values δ from the shift positions of the ch-1 SP Mode video head 34a and the ch-1 audio head 34e causing the maximum values to the initial shift position Xo are respectively calculated, resulting in the respective track deviation data δ of the ch-1 audio track TPe and the ch-1 SP Mode video track TPa equivalent to the respective displacement values δ.

(7) Step 17: The audio and video compensated track deviation data are respectively obtained by subtracting the audio and video track deviation compensation data preliminarily stored in the track deviation compensation data memory section 59, from the audio and video track deviation data δ.

(8) Step 18: The compensated track deviation data are outputted from the output section 61 in a manner shown in FIGS. 16(A), 16(B) or 17.

As shown in FIGS. 16(A), 16(B), the video and audio track deviation data are individually shown, but it is possible to display them on the display device in a superimposed manner with different colors.

As mentioned in the foregoing, according to the first embodiment of the track deviation measurement method and apparatus in the present invention, it is possible to perform an automatic and speedy measurement of the track deviation of the preliminarily recorded track in a helical scanning manner on the magnetic tape 2A by being installed in the magnetic recording/reproducing apparatus 10B for the measurement. These features enable an instant evaluation of a track deviation characteristic of the magnetic recording/reproducing apparatus by which the recorded track of the magnetic tape 2A has been recorded.

Further, it is possible to reuse the recorded magnetic tape 2A again because the recorded magnetic tape 2A does not need to be cut at all. This feature enables an instant evaluation of duplicated prerecorded tapes for sale before shipping, resulting in presenting such commercial tapes having excellent quality and interchangeability without such track deviation which may otherwise disturb users.

Furthermore, it is possible to simultaneously measure the track deviations of both the audio recorded track formed in a deeper portion of the magnetic layer and the video recorded track recorded over the audio recorded track.

[Second Embodiment]

Figure 18:
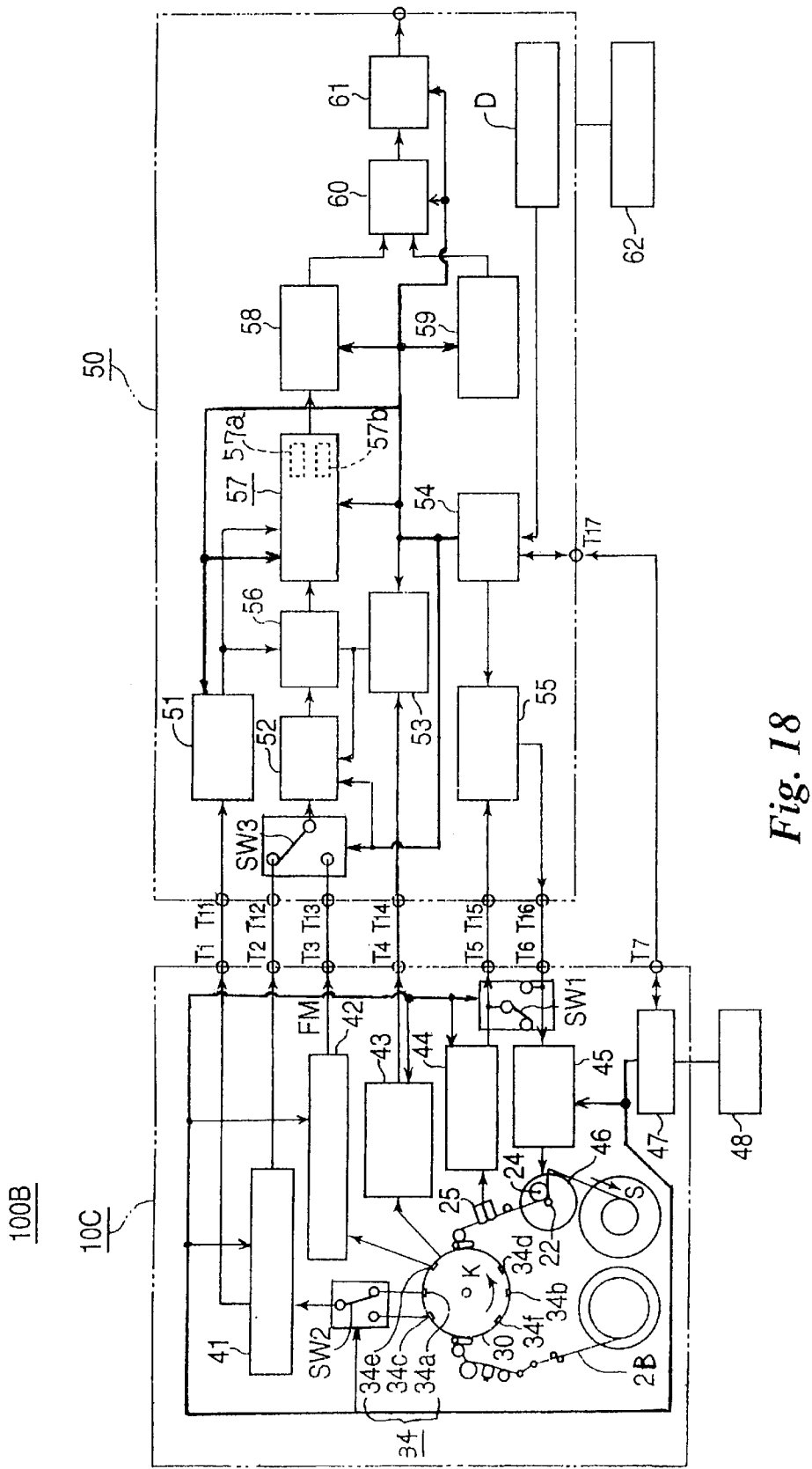
FIG. 18 is a block diagram showing a construction of a second embodiment of the present invention.
Figure 19:
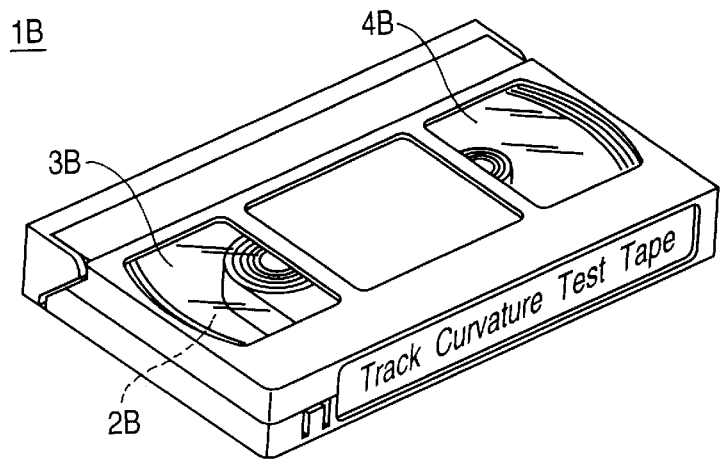
FIG. 19 is a perspective view showing a test tape cassette used in the second embodiment, and in the test tape cassette, a magnetic tape formed with a recorded tape pattern having almost no track deviation are accommodated.
Figure 20:
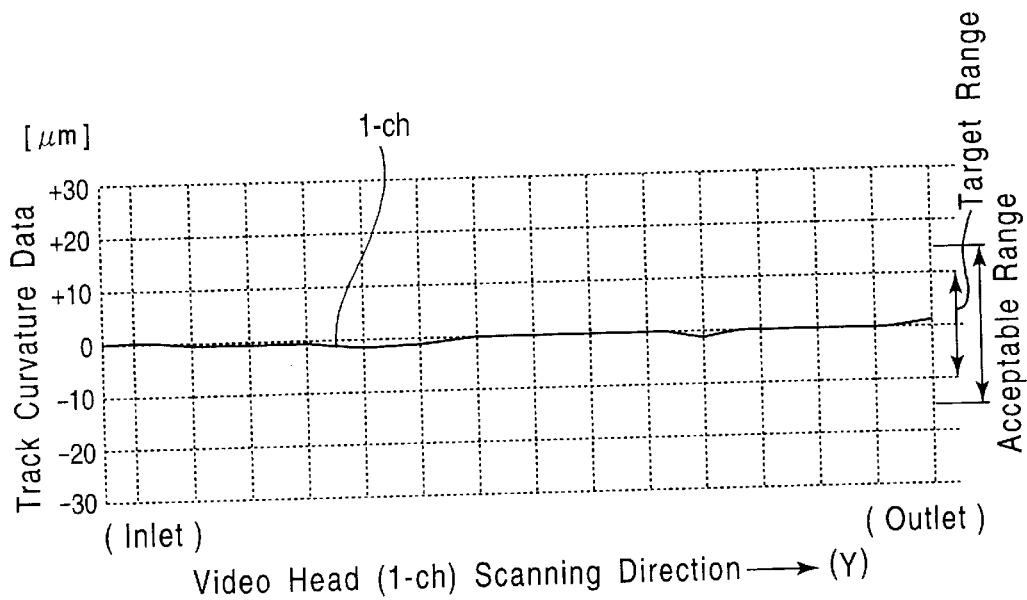
FIG. 20 is a graph showing track deviation data measured on an apparatus using the test tape cassette shown in FIG. 19.

FIG. 18 is a block diagram showing a construction of a second embodiment of the present invention;

FIG. 19 is a perspective view showing a test tape cassette, used in the second embodiment in which test tape cassette, a magnetic tape formed with a recorded tape pattern having almost no track deviation is accommodated; and FIG. 20 is a graph showing track deviation data measured on an apparatus using the test tape cassette shown in FIG. 19, wherein a ch-1 video track is recorded.

Track deviation measuring arrangement 100B for measuring the track deviation of the second embodiment in the present invention shown in FIG. 18 has the same construction as that of the apparatus 100A except for a fact that a magnetic recording/recproducing apparatus 10C is not a part of the measuring apparatus but an apparatus which is to be measured of its track deviation error, i.e., nonlinearity of head scanning locus. Note that if necessary the apparatus 10C is modified to the same construction as that of the apparatus 10B, and is connected to the personal computer 50 for the measurement. Here, the like parts are denoted with the like reference characters, and different parts are denoted with other reference characters. The description is given of different points from the first embodiment.

Prior to the explanation of the track deviation measuring method and the arrangement 100B shown in FIG. 18, the description is given of a standard magnetic tape 2B for measuring the track deviation of the apparatus 10C in the second embodiment referring to FIGS. 19 an 20.

As shown in FIG. 19, the standard magnetic tape 2B, of which ends are respectively wound around a supply reel 3B and a take-up reel 4B, is accommodated in a standard tape cassette 1B for measuring the track deviation of the apparatus 10C. On the test magnetic tape 2B, recorded tracks having almost no track deviation are obliquely formed in a predetermined direction.

The standard magnetic tape 2B is pre-recorded by using a magnetic recording/reproducing apparatus (not shown) free from the track deviation conforming to the previously mentioned industry standard.

Further, as shown in FIG. 20, the track deviation value of the test magnetic tape 2B is well controlled to be less than ±1.5 μm in the SP Mode recorded track. This value is much less compared with the acceptable range specified in the industry standard and with the target value mentioned in the foregoing.

In the EP Mode and audio recorded tracks, the track deviation value of the standard magnetic tape 2B is well controlled to be less than ±1.5 μm as well.

Thus, it will be understood that when this standard magnetic tape 2B is reproduced on a magnetic recording/reproducing apparatus 10C which is to be evaluated, its track deviation exhibits the track deviation caused by the apparatus 10C to be evaluated.

According to the second embodiment of the present invention, a track deviation characteristic of a magnetic recording/reproducing apparatus is evaluated by utilizing the above explained principle of the standard magnetic tape 2B in a non-destructive method.

Accordingly, the description is given based on a fact that the standard magnetic tape 2B itself has virtually no track deviation but a magnetic recording/reproducing apparatus to be evaluated has a possibility of causing a track deviation or a disagreement between its head locus and its scanning track of the standard magnetic tape 2B as a track scanning error.

In the track deviation measuring method and arrangement 100B of the second embodiment shown in FIG. 18, the magnetic recording/reproducing apparatus 10C to be evaluated is electrically connected to the personal computer 50 through the connectors T1 to T7 and T11 to T17. And, the standard magnetic tape 2B on which obliquely recorded tracks are formed, is helically wound around the rotary drum 30 at a predetermined angular range in the apparatus 10C and is driven by being pinched between a pinch-roller 24 and a capstan 22 in the direction of the arrow S, while rotary heads 34 provided on the rotary drum 30 are rotated together with the rotary drum 30 in the direction of the arrow K. In this state, the by controlling a capstan rotation momentarily, positions of the rotary heads 34 relative to the recorded tracks are displaced in a longitudinal direction of the standard magnetic tape 2B. This causes the rotary head 34 to move across the recorded track vertically. At every stepwise displacement the rotary heads 34, a variation of envelope of an FM output signal caused by a head scanning locus nonlinearity of the magnetic recording/reproducing apparatus 10C is measured. After that, digital data obtained from the envelopes of the FM output signals are processed by the personal computer 50, resulting in track deviation data caused by the recording/reproducing apparatus 10C. The magnetic recording/reproducing apparatus 10C may be one of commercial products equipped with such capability of connecting with the computer 50.

Accordingly, the features of the second embodiment are different from those of the first embodiment as follows.

(1) Object to be tested is a magnetic recording/reproducing apparatus, a head scanning locus nonlinearity of the apparatus can be measured by using the standard magnetic tape 2B having almost no track deviation.

(2) Availabilty of such a standard magnetic tape 2B having almost no track deviation is extremely difficult, therefore, instead of having such an ideal standard tape, compensation data inherent to the standard tape 2B obtained by the same microscope method applied in the first embodiment, are stored in the track deviation compensation data memory section 59 of the personal computer 50.

As the measuring procedure of the second embodiment is performed in the same manner as that of the first embodiment, the description is thus omitted here.

According to the track deviation measurement method and arrangement 100B, it is possible to detect the track deviation on the magnetic tape caused by off-standard magnetic recording/reproducing apparatuses being manufactured in the factory. This assures that only the magnetic recording/reproducing apparatuses having a high quality and reliability regarding the track and the tape interchangeability, are shipped out of the factory.

Further, the standard magnetic tape 2B can be repeatedly used because of the non-destructive method.

Further, it is possible not only to measure both the video recorded track and the audio recorded track formed under the video recorded track but also to measure both of them together.

Through the description, the magnetic recording/reproducing apparatuses 10B, 10C conforming to the well-known VHS standard or the S-VHS standard, are applied to these embodiments, however, type magnetic recording/reproducing apparatus as of other standards employing such a helical scanning system can be applied to the present invention.

What is claimed is:

1. Method for measuring a track deviation of magnetic tape on which tracks are recorded with an FM modulated signal according to a standard helical scanning system, the magnetic tape being loaded to a measuring magnetic tape reproducing apparatus conforming to the standard helical scanning system, the apparatus having a rotary drum with at least a rotary head, thereby the magnetic tape is transported in a longitudinal direction thereof in the apparatus and scanned helically by the rotary head for measuring the track deviation, the method comprising steps of:

setting measuring points along each of the tracks;

stepwise shifting the magnetic tape in the longitudinal direction for causing rotary head positions to displace stepwise and relatively with respect to the tracks along a track traversing line which passes through each of the measuring points perpendicularly to the tracks;

measuring amplitude levels of the FM modulated signal at respective positions of the rotary head displaced stepwise along the track traversing line;

converting thus measured amplitude levels into digital data;

calculating to estimate, by using the digital data, a specific rotary head position at which a maximum amplitude level of the FM signal is reproduced within each of the track traversing line, each of the specific rotary head position having a positional value;

subtracting a predetermined positional value from each positional value of respective specific rotary head positions located along each of the tracks, wherein the predetermined positional value is determined to be a track center position of standard track having a slant angle conforming to the standard helical scanning system, thereby values of the track deviation varying along a track referred to the standard track are measured.

2. Method for measuring a track deviation as claimed in claim 1 further comprising the step of applying compensation values respectively to the values of track deviation, the compensation values being obtained by calibrating the measuring magnetic tape recording apparatus in a conventional manner.

3. Method for measuring a track deviation as claimed in claim 1, wherein the amplitude values of the FM modulated signal are obtained from a signal reproduced from a video signal track.

4. Method for measuring a track deviation as claimed in claim 1, wherein the amplitude values of the FM modulated signal are obtained from a signal reproduced from an audio signal track recorded under a video signal track within a magnetic layer of the magnetic tape.

5. Method for measuring a track deviation as claimed in claim 1, wherein the amplitude values of the FM modulated signal are obtained alternately from signals reproduced from an audio signal track recorded under a video signal track within a magnetic layer of the magnetic tape and reproduced from the video signal track.

6. A track deviation measuring method comprising the steps of:

helically winding a test magnetic tape formed with recorded tracks which are obliquely recorded in a predetermined direction by using a magnetic recording/reproducing apparatus employing a helically scanning method, around a rotary drum having at least a rotary head of a magnetic recording/reproducing apparatus at a predetermined angle and driving the test magnetic tape along a predetermined tape path, the recorded tracks of the test magnetic tape having almost no track deviation;

relatively and stepwise shifting the rotary head to recorded tracks in a width direction of the magnetic tape in a predetermined range by causing the test magnetic tape to be displaced in a tape running direction;

measuring values of an FM envelope at plural measuring points set up along each of the recorded tracks by causing the rotary head to scan on the recorded tracks at every stepwise shifting position of the rotary head;

converting the values of the FM envelope obtained at the plural measuring points into digital data and to store the digital data in a memory section;

calculating a stepwise shifting position of the rotary head corresponding to a maximum value among the plural digital data obtained at a certain measuring point among the plural measuring points, and other stepwise shifting positions of the rotary head corresponding to maximum values at the rest measuring points among the plural measuring points;

calculating a deviation value of each of the stepwise shifting positions corresponding to the maximum values from a center of a normal recorded track; and forming track deviation data from the deviation value of each of the stepwise shifting positions of the rotary head.

7. A track deviation measuring method as claimed in claim 6 further comprising the steps of storing compensation track deviation data with respect to the test magnetic tape and obtaining a corrected track deviation data by subtracting the compensation track deviation data from the obtained track deviation data.

8. A track deviation measuring method as claimed in claim 6, wherein the values of the FM envelope are obtained from reproduced output signal from a video recorded track.

9. A track deviation measuring method as claimed in claim 6, wherein the values of the FM envelope are obtained from reproduced output signal from an audio recorded track recorded in a deep portion of a magnetic layer of the test magnetic tape under a video recorded track.

10. A track deviation measuring method as claimed in claim 6, wherein the values of the FM envelope are obtained from reproduced output signal from an audio recorded track recorded in a deep portion of a magnetic layer of the test magnetic tape under a video recorded track, and the video recorded track by alternately switching in a time sharing method.

11. Track deviation measuring apparatus for measuring a track deviation of magnetic tape on which tracks are recorded with an FM modulated signal according to a standard helical scanning system, the apparatus comprising:

a measuring magnetic tape reproducing device conforming to the standard helical scanning system, the device having a rotary drum with at least a rotary head, the magnetic tape being loaded and transported in a longitudinal direction thereof in the device and scanned helically by the rotary head for measuring the track deviation, the apparatus comprising:

means for setting measuring points along each of the tracks;

means for stepwise shifting the magnetic tape in the longitudinal direction for causing rotary head positions to displace stepwise and relatively with respect to the tracks along a track traversing line which passes through each of the measuring points perpendicularly to the tracks;

means for measuring amplitude levels of the FM modulated signal at respective positions of the rotary head displaced stepwise along the track traversing line;

means for converting thus measured amplitude levels into digital data;

means for storing the digital data converted by the converting means;

means for calculating to estimate, by using the digital data, a specific rotary head position at which a maximum amplitude level of the FM signal is reproduced within each of the track traversing line, each of the specific rotary head position having a positional value;

means for subtracting a predetermined positional value from each positional value of respective specific rotary head positions located along each of the tracks, wherein the predetermined positional value is determined to be a track center position of standard track having a slant angle conforming to the standard helical scanning system, so that values of the track deviation varying along a track referred to the standard track are measured.

12. A track deviation measuring apparatus as claimed in claim 11 further comprising: additional memory means for storing compensation values to be applied to the values of the track deviation varying along the track, wherein the compensation values are obtained by calibrating the measuring magnetic tape reproducing apparatus in a conventional manner and arithmetic means for calculating a corrected track deviation values by subtracting respectively the compensation values from the values of the track deviation outputted from the subtracting means.

13. A track deviation measuring apparatus as claimed in claim 11, wherein the FM modulated signal is selectively reproduced from a video signal track and an audio FM output signal track, by switching means provided to the apparatus.

14. A track deviation measuring apparatus as claimed in claim 11, wherein the switching means alternates signals reproduced from the video and audio signal tracks in a time sharing manner.

15. Method for measuring a head locus deviation of magnetic tape reproducing apparatus conforming to a standard helical scanning system by using a standard magnetic tape on which tracks are recorded with an FM modulated signal conforming to the standard helical scanning system, the tracks having minimum track deviation and the apparatus having a rotary drum with at least a rotary head, the method comprising steps of:

loading the standard magnetic tape to the magnetic tape reproducing apparatus to be measured of the head locus deviation value, thereby the standard magnetic tape is transported in a longitudinal direction thereof in the apparatus and scanned helically by the rotary head for measuring the head locus deviation;

setting measuring points along each of the tracks;

stepwise shifting the magnetic tape in the longitudinal direction for causing rotary head positions to displace stepwise and relatively with respect to the tracks along a track traversing line which passes through each of the measuring points perpendicularly to the tracks;

measuring amplitude levels of the FM modulated signal at respective positions of the rotary head displaced stepwise along the track traversing line;

converting thus measured amplitude levels into digital data;

calculating to estimate, by using the digital data, a specific rotary head position at which a maximum amplitude level of the FM signal is reproduced within each of the track traversing line, each of the specific rotary head position having a positional value;

subtracting a predetermined positional value from each positional value of respective specific rotary head positions located along each of the tracks, wherein the predetermined positional value is determined to be a track center position of standard track having a slant angle conforming to the standard helical scanning system, thereby values of the head locus deviation varying along a track scan referred to the standard track is measured.

16. Method as claimed in claim 15 further comprising the steps of: storing track deviation compensation data of the standard magnetic tape in a track deviation compensation memory means of a track deviation measuring apparatus and obtaining a corrected track deviation data by subtracting the track deviation compensation data from the obtained track deviation data.

17. Method as claimed in claim 15, wherein the FM modulated signal is selectively reproduced from a group of a video signal track and an audio signal track by switching means provided in the magnetic tape reproducing apparatus.

18. Method as claimed in claim 15, wherein the amplitude levels of the FM modulated signal are alternately reproduced from a video signal track and an audio signal track in a time sharing manner.

* * * * *